(12) United States Patent
Hohl

(10) Patent No.: US 7,952,522 B2
(45) Date of Patent: May 31, 2011

(54) RELATIVE 3D POSITIONING IN AN AD-HOC NETWORK BASED ON DISTANCES

(75) Inventor: Fritz Hohl, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 374 days.

(21) Appl. No.: 12/094,617

(22) PCT Filed: Feb. 14, 2007

(86) PCT No.: PCT/EP2007/001286
§ 371 (c)(1),
(2), (4) Date: May 22, 2008

(87) PCT Pub. No.: WO2007/093404
PCT Pub. Date: Aug. 23, 2007

(65) Prior Publication Data
US 2008/0309556 A1 Dec. 18, 2008

(30) Foreign Application Priority Data
Feb. 15, 2006 (EP) ..................................... 06003078

(51) Int. Cl.
*G01S 3/02* (2006.01)
(52) U.S. Cl. ...................................................... 342/463
(58) Field of Classification Search .................... 342/463
See application file for complete search history.

(56) References Cited

U.S. PATENT DOCUMENTS
7,292,187 B2 * 11/2007 Recker ........................... 342/458
2003/0117966 A1 * 6/2003 Chen ............................. 370/255

FOREIGN PATENT DOCUMENTS
WO WO 02/03091 1/2002

OTHER PUBLICATIONS

Chris Savarese, et al., "Locationing in Distributed Ad-Hoc wireless sensor networks", 2001 IEEE International Conference on Acoustics, Speech, and Signal Processing, Proceedings. (ICASSP). Salt Lake City, UT, May 7-11, 2001, IEEE International Conference on Acoustics, Speech, and Signal Processing (ICASSP), New York, NY : IEEE, US, vol. vol. 1 of 6, May 7, 2001, pp. 2037-2040, XP010803422.

(Continued)

*Primary Examiner* — Thomas H Tarcza
*Assistant Examiner* — Nga X Nguyen
(74) *Attorney, Agent, or Firm* — Oblon, Spivak, McClelland, Maier & Neustadt, L.L.P.

(57) ABSTRACT

A positioning apparatus for a wireless ad-hoc network that can measure distances between network nodes that are in range and connected to each other. The positioning apparatus can calculate 3D positions of some nodes using the distance values using a relative coordinate system, first by measuring distances to neighbored nodes, receiving and sending distance reports to/from neighbors, by second initially advantageously selecting the set of base nodes to which the coordinate system relates, and by calculating positions of the base nodes and other nodes in the network initially, and by third detecting movements in the network and by calculating positions of the moved nodes. The network can compensate for movements of the base nodes, select the base nodes in an advantageous way, and cope with sleeping nodes, with unreliable communication, and with fluctuating network topologies. Neighbor communication is used only if no node is sleeping.

24 Claims, 10 Drawing Sheets

OTHER PUBLICATIONS

Nissanka B. Priyantha, et al., "Anchor-Free Distributed Localization in Sensor Networks" Tech Report, No. 892, Apr. 15, 2003, pp. 1-13, XP002403576 MIT laboratory for Computer Science.

Ultra Wideband (UWB) Frequently Asked Questions (FAQ); Reviesed Jul. 31, 2003; 21 Pgs.

Knoben, P.; The Math Forum; Ask Dr. Math Questions & Answers From Our Archives; Intersection of Circles; pp. 1-2; dated Jan. 16, 2002; http://mathforum.org/library/drmath/view/51836.html.

Thomas, F.; et al; Revisiting Trilateration for Robt Localization (Submitted to the IEEE Trans on Robotics and Automation); 9 Pgs.

Savvides A., et al.; The Bits and Flops of the N-hop Multilateration Primitive for Node Localization Problems; Networked and Embedded Systems Lab, Electrical Engineering Dept., Univ. of Cali, Los Angeles; 10 Pgs.

Langendoen, K., et al.; Computer Networks 43 (2003); Distributed Localization in Wireless Sensor Networks: A Quantitative Comparison; Faculty of Information Technology and Systems, Delft Univ. of Tech., 2828 CD Delft, Netherlands; pp. 499-518.

Savvides, A., et al.; Dynamic Fine-Grained Localization in Ad-Hoc Networks of Sensors; Networked and Embedded Systems Lab, University of California, Los Angeles; pp. 166-179.

Niculescu, D., et al.; Ad Hoc Positioning System (APS); Computer Science Dept.; Rutgers Univ., Piscataway, NJ, 08855; 2001 IEEE; pp. 2926-2931.

Savarese, C., et al.; Robust Positioning Algorithms for Distributed Ad-Hoc Wireless Sensor Networks; 11 Pgs.

Srdan Capkun, et al., "GPS-free positioning in mobile Ad-Hoc networks", Proceedings of the $34^{th}$ Annual Hawaii International Conference on System Science, Jan. 3, 2001, pp. 1-10, XP008001836.

Chris Savarese, et al., "Locationing in Distributed Ad-Hoc wireless sensor networks", 2001 IEEE International Conference on Acoustics, Speech, and Signal Processing, Proceedings. (ICASSP). Salt Lake City, UT, May 7-11, 2001, IEEE International Conference on Acoustics, Speech, and Signal Processing (ICASSP), New York, NY : IEEE, US, vol. 1 of 6, May 7, 2001, pp. 2037-2040, XP010803422.

Nissanka B. Priyantha, et al., "Anchor-Free Distributed Localization in Sensor Networks" Tech Report, No. 892, Apr. 15, 2003, pp. 1-13, XP002403576 MIT laboratory for Computer Science.

\* cited by examiner

RELATIVE 3D POSITIONING IN AN AD-HOC NETWORK BASED ON DISTANCES

TECHNICAL FIELD OF THE INVENTION

The present invention relates to the field of 3D positioning in ad-hoc networks like e.g. Bluetooth networks wherein the wireless connections between the wireless electrical devices are automatically and independently established. Numerous applications for ad-hoc networks are based on the "real world" positions of the nodes. Often these applications do not require absolute positions (i.e. such that are based on some standard world coordinate system like WGS84) but simply relative 3D coordinates. "Relative" means here that the positions are expressed in a coordinate system that relies on some special positions that constitute this coordinate system. Often these positions are the ones determined by a group of special nodes in the network. A position in a relative coordinate system cannot specify the position of a node in space absolutely, but only with respect to the coordinate system defining nodes. Still, this relative position keeps the distances between the nodes (i.e. the distance between all positions can be calculated, not only those for which the network can measure distances), and the relative spatial relationship between the nodes (e.g. if node B is located between node A and C in reality, also the position of node B in the relative coordinate system is located between the positions of node A and C).

The group of nodes that determine the coordinate system will be called in the following the basis, the nodes in the basis are the base nodes. Obviously, any fluctuation in the basis as well as movements of the base nodes might affect the coordinate system. As a result the coordinate system might change, which in turn might lead to (wrongly) changed positions of the non-base nodes. In order to prevent changes in the coordinate system two mechanisms are needed. First, the basis has to be chosen in a way that fluctuations and movements are as unlikely as possible. Second, if a base node moves, it would be advantageous to be able to compensate for this movement. Finally, when there are different possible bases even under above-mentioned aspect of basis stability, other optimization criteria might be applied in order to select the most advantageous basis.

Positioning systems that use relative positioning are also called anchor-free because the used coordinate system is not determined by the set of known positions (often in a standard coordinate system) of a group of special nodes called the "anchors". These known positions are typically measured by another positioning system (like GPS) or pre-configured for non-moving nodes.

Using positioning in wireless ad-hoc networks also imposes restrictions to the used positioning system. First, most wireless networks do not provide a reliable communication. Therefore the positioning system has to cope with unreliable communication. While many wireless ad-hoc networks provide efficient neighbor communication (often in form of a neighbor broadcast), using multi-hop communication is sometimes not possible in some networks or is costly in terms of delay and effort. Therefore the positioning system should use mainly neighbor communication. One characteristic of wireless ad-hoc networks is the possibility of a constant fluctuation in connectivity to nodes. This can be caused by technical problems (e.g. noise peaks), or by movement of nodes. Therefore, the positioning system has to be able to cope with these problems. In addition, not being able to rely on the existence of nodes over time prevents positioning system designs that cannot cope with situations where some node disappear unexpectedly and unannounced.

Some networks allow nodes to go to a sleep mode from time to time. During this sleep mode no application code (like positioning calculation) can be executed while the node itself might still appear in the network and be the subject of distance measurements. The positioning system should therefore be able to calculate positions also in situations where some nodes are in sleep mode.

Ideally, a positioning system has to fulfill the following requirements.

Functional Requirements:

Req. 1: The needed component shall be able to return the 3D position of all nodes of an ad-hoc network in a relative coordinate system if it is technically possible to calculate this 3D position. If only a 2D position can be calculated for a node, this 2D position shall be returned.

Req. 2: The component shall use only 3D distances measured by the network and other data available through the network for determining the positions.

Req. 3: No previously known positions (e.g. using GPS or pre-configured) shall be used when computing the positions.

Req. 4: The nodes constituting the coordinate system at the beginning (the base nodes) shall be selected in a way that it can be expected that the resulting coordinate system is stable for a time period as long as possible.

Req. 5: Whenever technically possible, movements of the base nodes shall not lead to changes of the coordinate system.

Req. 6: The component shall use mainly neighbor communication.

Optimization Targets:

Req. 7: The calculation of the positions shall not require too much computational effort from a node.

Req. 8: The calculation of the positions shall not put a significant load to the network traffic.

Issues that have to be Taken into Account:

Req. 9: The component shall take into account the dynamicity of a wireless ad-hoc network resulting from unreliable connections, movements and other reasons when it comes to
  nodes entering/leaving the network
  nodes being un-/reachable Req. 10: The component shall take into account that network data communication can be unreliable.

Req. 11: The component shall take into account that sleeping nodes cannot execute application code while in sleep.

TERMS AND DEFINITIONS

Anchor node that knows its position beforehand either by configuration or by measurement
Base node node that is a member of the Basis
Basis the set of nodes that determine the used coordinate system initially
Host status either sleeping or running. See sleep mode.
Sleep mode a mode a network node can be in. In this mode other nodes can still measure distances to this node and the node participates in the network, but no application code is executed.

DESCRIPTION OF RELATED ART

N-Hop Multilateration (2002)

In "The bits and flops of the N-hop multilateration primitive for node localization problems" by A. Savvides et al. an algorithm is presented that is also aiming to position nodes in a wireless sensor environment that contains a number of anchor nodes that can measure their position.

To that end, according to "Distributed localization in wireless sensor networks: a quantitative comparison" by Koen Langendoen and Niels Reijers, three phases exist also for this algorithm:

The first phase "[ . . . ] starts at the anchors, which send a message including their identity, position, and a path length set to 0. Each receiving node adds the measured range to the path length and forwards (broadcasts) the message if the flood limit allows it to do so. Another constraint is that when the node has received information about the particular anchor before, it is only allowed to forward the message if the current path length is less than the previous one. The end result is that each node will have stored the position and minimum path length to at least flood limit anchors."

In the second phase the "[ . . . ] main idea is to construct a bounding box for each anchor using its position and distance estimate, and then to determine the intersection of these boxes. The position of the node is set to the center of the intersection box. FIG. 1 illustrates the Min-max method for a node 14 with distance estimates to three anchors 11, 12 and 13. The estimated node 15 lies within a rectangular box 16 which is formed by the respective perpendicular or parallel tangents 112, 113, 122, 123, 132 and 133 of the transmission circle 111, 121 and 131 intersecting in node 14. Note that the estimated node 15 by Min-max is close to the true node 14 computed through Lateration. The bounding box of anchor is created by adding and subtracting the estimated distance (da) from the anchor position (xa, ya):

$$[x_a-d_a, y_a-d_a] \times [x_a+d_a, y_a+d_a]$$

The intersection of the bounding boxes is computed by taking the maximum of all coordinate minimums and the minimum of all maximums:

$$[\max(x_i-d_i), \max(y_i-d_i)] \times [\min(x_i+d_i), \min(y_i+d_i)]$$

The final position is set to the average of both corner coordinates. [ . . . ] we only accept the final position if the residue is small."

In the third or refinement phase they "[ . . . ] group nodes into so-called computation subtrees (over-constrained configurations) and enforce nodes within a subtree to execute their position refinement in turn in a fixed sequence to enhance convergence to a pre-specified tolerance."

Ad-Hoc Localization System (AHLoS, UCLA, 2001)

In "Dynamic Fine-Grained Localization in Ad-Hoc Networks of Sensors" by Andreas Savvides et al. a system is presented that "enables sensor nodes to discover their locations using a set [of] distributed iterative algorithms". It is also aiming to position nodes in a wireless sensor environment that contains a number of anchor nodes that can measure their position.

"Given a ranging technology that estimates node separation we now describe our localization algorithms. These algorithms operate on an ad-hoc network of sensor nodes where a small percentage of the nodes are aware of their positions either through manual configuration or using GPS. We refer to the nodes with known positions as beacon nodes and those with unknown positions as unknown nodes. Our goal is to estimate the positions of as many unknown nodes as possible in a fully distributed fashion. The proposed location discovery algorithms follow an iterative process. After the sensor network is deployed, the beacon nodes broadcast their locations to their neighbors. Neighboring unknown nodes measure their separation from their neighbors and use the broadcasted beacon positions to estimate their own positions. Once an unknown node estimates its position, it becomes a beacon and broadcasts its estimated position to other nearby unknown nodes, enabling them to estimate their positions. This process repeats until all the unknown nodes that satisfy the requirements for multilateration obtain an estimate of their position. This process is designed as iterative multilateration that uses atomic multilateration [taking into account the measured distances] as its main primitive."

Self-Positioning Algorithm (SPA, EPFL, 2000)

The used algorithm of "GPS-free positioning in mobile Ad-Hoc networks" by Srdan Capkun et al. and WO 02/03091 A2 can be described as follows:

1. State the local coordinate system and neighbored positions. At every node:
   1a. detect one-hop neighbors
   1b. measure the distance to all one-hop neighbors
   1c. send the list of one-hop neighbors and their distances to all one-hop neighbors
   1d. own position: (0.0)
   1e. compute of the position of all neighbored nodes (if possible)
2. State the Network Coordinate System
   2.a Establish the Location Reference Group (LRG) as a set of nodes that are "stable and less likely to disappear from the network". Compute the origin and the direction of the Network Coordinate System using this LRG.
3. Adjust positions in the local coordinate systems to the Network Coordinate System
   3.a Starting from the LRG, propagate the Network Coordinate System and adjust the local positions.

FIG. 2 illustrates the Input and Output of SPA. On the left side a network 21 is shown comprising a plurality of nodes and connections like e.g. node d 211, node c 212 and their connection 213 to each other. On the right side a coordinate system 22 is shown comprising the same nodes from the network 21 now indicated by xy-coordinates. Node d 221 and node c 222 are also shown.

Anchor-Free Distributed Localization (AFL, MIT, 2003)

In "Anchor-free distributed localization in sensor networks" by N. Priyantha et al. an algorithm is presented that also positions nodes in a relative coordinate system (i.e. anchor-free). This is done by a two-phase mechanism. In the first phase two pairs of nodes are selected in a way that a) the nodes of each pair are as distant as possible, b) that the two lines given by the algorithm are as perpendicular as possible. These two lines are then used as axes for a starting solution of the positions. This starting solution is then refined by a so-called "mass-spring optimization" algorithm. This algorithm considers the nodes as being connected by springs whose length corresponds to the measured distance. After the optimization the powers in this network of springs are balanced. The algorithm for the starting phase ensures that the optimization does not run into some false minima where the resulting position graph is a folded (and therefore unrealistic) version of the true position graph.

Ad-Hoc Positioning (2001)

In "Ad-hoc positioning system" by D. Niculescu and B. Nath an algorithm is presented that is also aiming to position nodes in a wireless sensor environment that contains a number of anchor nodes that can measure their position. To that end, according to "Distributed localization in wireless sensor networks: a quantitative comparison" by Koen Langendoen and Niels Reijers, two phases exist for this algorithm:

The first phase "[ . . . ] is based on the local geometry of the nodes around an anchor. Again anchors initiate a flood, but forwarding the distance is more complicated than in the previous cases. When a node has received messages from two neighbors that know their distance to the anchor, and to each other, it can calculate the distance to the anchor.

[ . . . ] shows a node (Self) that has two neighbors n1 and n2 with distance estimates (a and b) to an anchor. Together with the known ranges c, d, and e, Euclidean arrives at two possible values (r1 and r2) for the distance of the node to the anchor. Niculescu describes two methods to decide on which, if any, distance to use. The neighbor vote method can be applied if there exists a third neighbor (n3) that has a distance estimate to the anchor and that is connected to either n1 or n2. Replacing n2 (or n1) by n3 will again yield a pair of distance estimates. The correct distance is part of both pairs, and is selected by a simple voting. Of course, more neighbors can be included to make the selection more accurate.

The second selection method is called common neighbor and can be applied if node n3 is connected to both n1 and n2. Basic geometric reasoning leads to the conclusion that the anchor and n3 are on the same or opposite side of the mirroring line n1–n2, and similarly whether or not Self and n3 are on the same side. From this it follows whether or not self and the anchor lay on the same side.

To handle the uncertainty introduced by range errors Niculescu implements a safety mechanism that rejects ill-formed (flat) triangles, which can easily derail the selection process by "neighbor vote" and "common neighbor". This check verifies that the sum of the two smallest sides exceeds the largest side multiplied by a threshold, which is set to two times the range variance. [ . . . ] Note that the safety check becomes stricter as the range variance increases. This leads to a lower coverage, defined as the percentage of non-anchor nodes for which a position was determined."

The second phase uses iterative multilateration.

ABC (2001)

In "Locationing in Distributed Ad-Hoc Wireless Sensor Networks" by Savarese et al. a 3D algorithm is presented that first selects three in-range nodes and assign them coordinates to satisfy the inter-node distances, then it incrementally calculates the coordinates of nodes using the distances to four nodes with already calculated coordinates using multilateration. Finally, an iterative refinement phase improves the calculated positions by having each node re-calculating its positions using the positions of its neighbors until the calculations have converged.

Robust Positioning (2002)

In "Robust positioning algorithms for distributed ad-hoc wireless sensor networks" by C. Savarese et al. an algorithm is presented that is also aiming to position nodes in a wireless sensor environment that contains a number of anchor nodes that can measure their position. To that end, according to "Distributed localization in wireless sensor networks: a quantitative comparison" by Koen Langendoen and Niels Reijers, three phases exist also for this algorithm:

The first phase "[ . . . ] essentially consists of two flood waves. After the first wave, which is similar to Sum-dist, nodes have obtained the position and minimum hop count to at least flood limit anchors. The second calibration wave is needed to convert hop counts into distances such that Phase 2 can compute a position. This conversion consists of multiplying the hop count with an average hop distance. Whenever an anchor a1 infers the position of another anchor a2 during the first wave, it computes the distance between them, and divides that by the number of hops to derive the average hop distance between a1 and a2. When calibrating, an anchor takes all remote anchors into account that it is aware of. Nodes forward (broadcast) calibration messages only from the first anchor that calibrates them, which reduces the total number of messages in the network."

The second phase uses iterative multilateration.

The third or refinement phase "[ . . . ] does take into account all internode ranges, when nodes update their positions in a small number of steps. At the beginning of each step a node broadcasts its position estimate, receives the positions and corresponding range estimates from its neighbors, and performs the Lateration procedure of Phase 2 to determine its new position. In many cases the constraints imposed by the distances to the neighboring locations will force the new position towards the true position of the node. When, after a number of iterations, the position update becomes small, Refinement stops and reports the final position. The basic iterative refinement procedure outlined above proved to be too simple to be used in practice. The main problem is that errors propagate quickly through the network; a single error introduced by some node needs only d iterations to affect all nodes, where d is the network diameter. This effect was countered by (1) clipping undetermined nodes with non-overlapping paths to less than three anchors, (2) filtering out difficult symmetric topologies, and (3) associating a confidence metric with each node and using them in a weighted least-squares solution (wAx=wb)."

Technical Problems on the Prior Art

The Prior Art does not fulfill every of the above-mentioned requirements. When considering Table 1 one can see that among the approaches that support relative positioning not every prior approach supports compensation for moving base nodes, selection of base nodes in an advantageous way, and requires neighbor broadcast only. No prior approach can cope with sleeping nodes or unreliable communication. Finally, only a few prior approaches consider 3D distances and return 3D positions (most 2D approaches claim that an according 3D approach can be derived easily).

SUMMARY

It is an object of the present invention to provide a positioning method in ad-hoc networks based on distances; thus the nodes do not require to know their absolute position beforehand.

Another object of the invention is to consider 3D distances and return 3D positions.

Another object of the invention is to cope with sleeping nodes.

Another object of the invention is to cope with unreliable communication.

Another object of the invention is to use neighbor broadcast only.

Another object of the invention is to select base nodes in a specific way.

Another object of the invention is to compensate for movements of the base nodes.

Another object of the invention is to use a less complex algorithm for calculating the positions of the nodes.

These objectives are solved by a positioning apparatus for a wireless ad-hoc network, said apparatus being operable to locate a current relative position of said apparatus and of a plurality of wireless electronic devices forming said wireless ad-hoc network, comprising a distance measuring gathering device operable to measure and gather data, said data comprising distances between said apparatus and said wireless electronic devices, respectively, and distances among said wireless electronic devices, wherein said distance measuring gathering device comprises a distance measurement device being operable to measure distances between said apparatus and said wireless electronic devices, and a positioning device operable to calculate the current relative position of said apparatus and said wireless electronic devices based on said distance data and a relative coordinate system, said positioning device comprising a basis finder device operable to calculate a basis and the relative coordinate system, wherein the relative coordinate system is based on said basis, wherein said basis comprises a specific number of base nodes, wherein said base node comprises said apparatus and/or wireless electronic devices, said base node having a specific number of base nodes in transmission range, the respective distances being unequal zero and the base nodes being orthogonally independent, whereby the basis finder device is designed to maintain the relative coordinate system when a base node is moved.

Favorably said basis comprises at least three wireless electronic devices.

Favorably said basis comprises at least four wireless electronic devices.

Favorably said positioning device is operable to calculate the current relative position by a 3D positioning algorithm.

Favorably said distance measurement device is operable to compensate measurement glitches and/or fluctuations by using predetermined threshold values. Favorably the positioning apparatus comprises a network component operable to establish a connection in the wireless network with neighbored wireless electronic devices.

Favorably the positioning apparatus comprises a position using application operable to query the current relative position from the positioning device.

Favorably the distance measuring gathering device comprises a distances data storage operable to store distance data.

Favorably the distance measuring gathering device comprises a send distance report device operable to transmit distance data to wireless electronic devices and a receive distance reports device operable to receive distance data from wireless electronic devices.

Favorably the distance measuring gathering device comprises a distances completizer device operable to query wireless electronic devices.

Favorably the distance completizer device is operable to remove a wireless electronic device from the distances data storage, when the wireless electronic device is not accessible for a predetermined time.

Favorably the positioning device comprises an positions data storage operable to store position data and an position calculator device operable to calculate the initial positions of all wireless electronic devices in the network.

Favorably the position calculator device is operable to set the position data to a void value, when the calculated position is outside a reasonable value and/or the sum of the difference in distances of a single wireless electronic device to all neighbored wireless electronic devices using the calculated positions and using the measured distances exceeds a certain threshold value and/or the Global Energy Ratio of the entire network exceeds a certain value.

Favorably the positioning device comprises a position monitor device operable to monitor criteria of the position data, wherein the criteria comprises the number of base nodes and the quality of the measurement, and to activate the basis finder device.

Favorably the positioning device comprises a movement monitor device operable to monitor the distance data in order to detect movements of wireless electronic devices and a moved position calculator device operable to calculate the position of moved wireless electronic devices.

Favorably the moved position calculator device is operable to remove wireless electronic devices from the positions data storage, when the wireless electronic device is not reachable.

Favorably the positioning device comprises a query/subscribe device operable to allow the position using application to query the position of a wireless electronic device.

Favorably the basis finder device is operable to select a basis depending on the maximum number of base nodes running with a specific power supply and/or depending on its lowest Global Energy Ratio value.

The object can also be solved by a method for locating a current relative position of a wireless electronic device in a wireless ad-hoc network, said wireless ad-hoc network comprising a plurality of wireless electronic devices, said method comprising distance gathering step comprising the steps of measuring distances to wireless electronic devices and/or receiving a distance report from wireless electronic devices, said distance report comprising distance data, and positioning step comprising the steps of determining a basis, calculating the positions and a relative coordinate system of the wireless electronic devices forming the basis and calculating the positions of the other wireless electronic devices based on said distance data and said relative coordinate system, wherein the relative coordinate system is based on said basis, wherein said basis comprises a specific number of base nodes, wherein said base node comprises said wireless electronic devices, said base node having a specific number of base nodes in transmission range, the respective distances being unequal zero and the base nodes being orthogonally independent, whereby the relative coordinate system is maintained when a base node is moved.

Favorably said positioning step comprises a basis selection step, said basis selection step being operable to select a basis consisting of at least three wireless electronic devices.

Favorably said positioning step comprises a basis selection step, said basis selection step being operable to select a basis consisting of at least four wireless electronic devices.

Favorably the positioning step comprises a calculation step of the current relative position by a 3D positioning algorithm.

Favorably said distance gathering step comprises a step of compensating measurement glitches and/or fluctuations by using predetermined threshold values.

Favorably said positioning step comprises a position calculation step operable either to calculate the position of the wireless electronic devices or to set the position data to a void value, when the calculated position is outside a reasonable value and/or the sum of the difference in distances of a single wireless electronic devices to all neighbored wireless electronic devices using the calculated positions and using the measured distances exceeds a certain threshold value and/or the Global Energy Ratio of the entire network exceeds a certain value.

Favorably said positioning step comprises a position monitoring step for monitoring the criteria of the position data, wherein the criteria comprises the number of base nodes and the quality of the measurement, and for activating the step of determining a basis, calculating the positions and a relative coordinate system.

Favorably said positioning step comprises a base selection step, said basis selection step comprising steps of calculating positions, counting the number of calculated positions, calculating the Global Energy Ratio, examining the wireless electronic device's power supply, wherein subsequently a basis is selected having the greatest number of wireless electronic devices, then having a specific power supply and the lowest Global Energy Ratio value.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF EMBODIMENT

Figure 1:
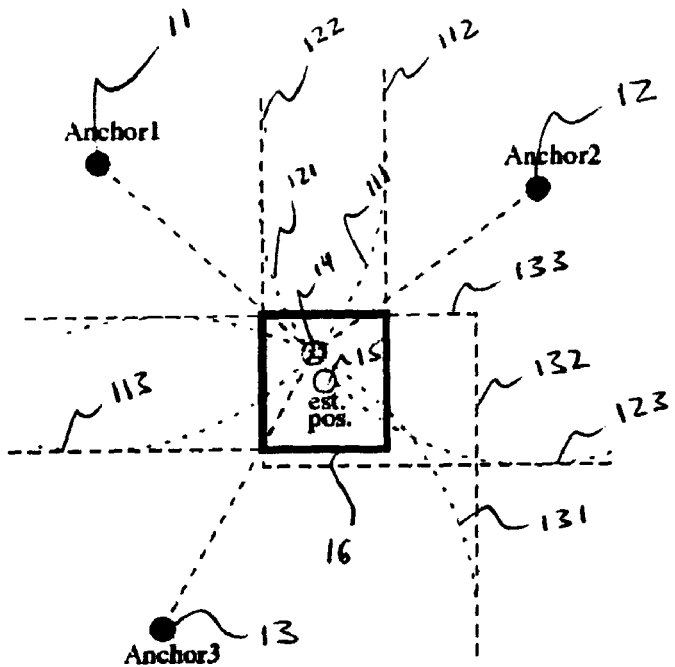
FIG. 1 shows a schematical view of an example of a state of the art method for position determining.
Figure 2:
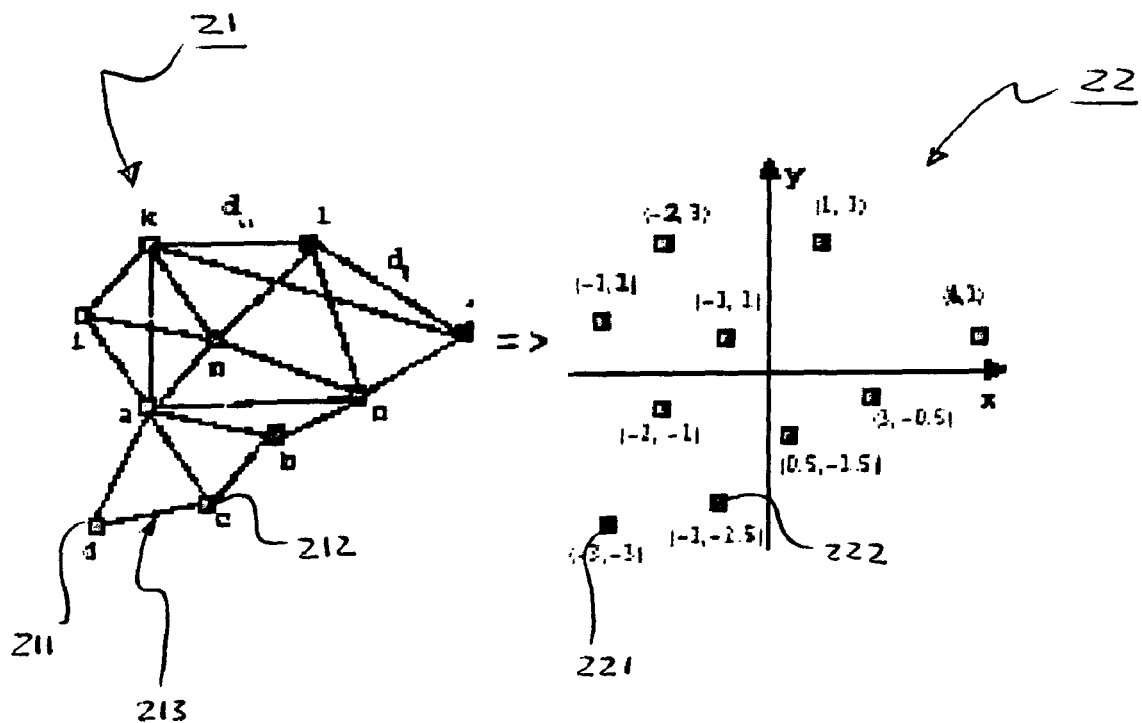
FIG. 2 shows a schematical view of another example of a state of the art method for position determining, Table 1 shows a comparison between the technical features of the state of the art methods and the subject-matter of the present invention.
Figure 3:
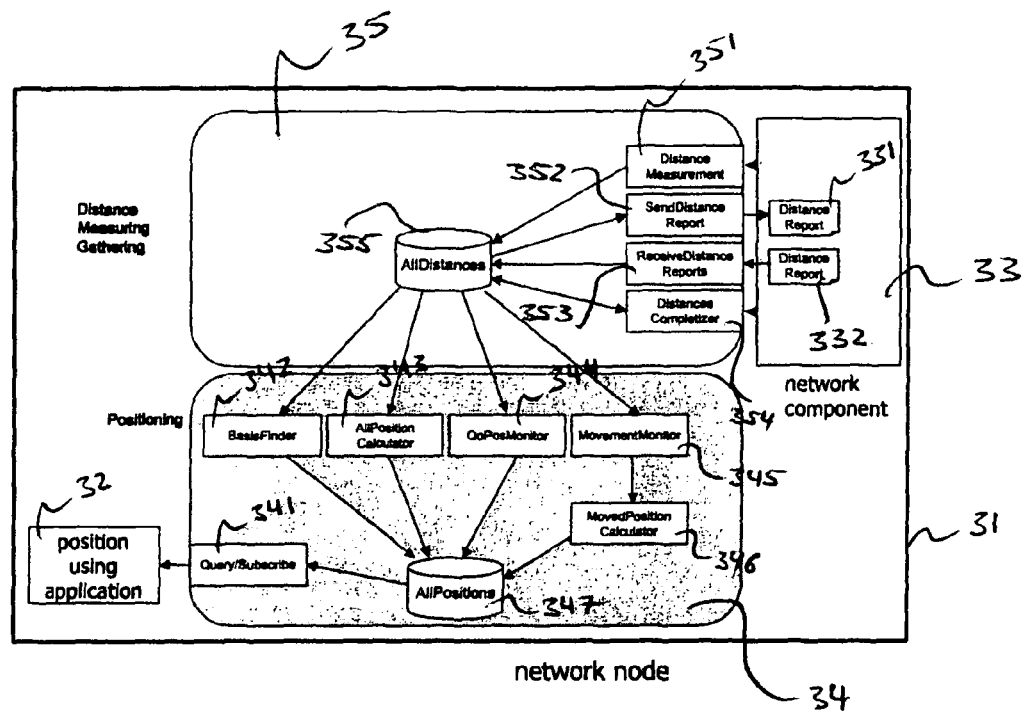
FIG. 3 shows an example of a network node comprising an embodiment of the present invention.

FIG. 3 shows a schematical view of an example of a wireless network node 31 comprising a network component 33, a position using application 32 and an embodiment of the present invention which comprises a Distance Measuring Gathering (DMG) device 35 and a Positioning (P) device 34. Any electronic wireless electronic device like e.g. cell phones, PDAs, notebooks, etc. can comprise the network node 31. A network system which is described later in FIG. 4 can be established comprising a wireless network node 31 and a plurality of network devices similar or the same like the wireless network node 31. Similar network devices might only contain the network component 33.

The network component 33 comprises the wireless network like e.g. Bluetooth communication which the P device 34 and/or the DMG device 35 is operable to use for transmission and reception of electromagnetic waves. Each node of the system has 0, 1 or both devices 34 and 35 running in addition to the network component 33. A number of the nodes 31 in the network can be in sleep mode. In order for the P device 34 to be active, at least one position using application 32 is located on the node 31 where the P device 34 is running.

The DMG device 35 is executed on the node 31 while being awake in order to allow efficient distance gathering. Said DMG device 35 is operable to measure the distance to neighbored nodes via the Distance measurement device 351, to receive distance reports 332 from other nodes via the Receive distance reports device 353 and to send distance reports 331 to neighbors via the Send distance report device 352. Eventually said DMG device 35 provides a list of all distances to the P device 34. The DMG device 35 comprises a Distance measurement device (DM) 351, a Send distance report device (SDR) 352, a Receive distance reports device (RDR) 353, a Distances completizer device (DC) 354 and an Distances (AD) data storage 355. In FIG. 3 the AD data storage 355 is indicated as AllDistances. As the DMG device 35 operates only while being awake, there can also be configurations for node 31 that do not contain the DMG device 35 even if positioning also includes the positions of such nodes 31 without DMG device 35 as shown later in FIG. 4.

The DM device 351 is operable to periodically measure the distances to the neighbors of this node using the network component 33 and to insert the distance of the neighbor nodes into the AD data storage 355. Said DM device 351 is also operable to apply processes to compensate for measurement glitches and to compensate for measurement fluctuations by using threshold values. The value of "time since measurement" is set to 0 for every distance measured to the neighbor nodes at the moment written to the AD data storage 355.

The SDR device 352 is operable to periodically send the list of all distances 331 to all neighbors wherein said list 331 being based to the data of the AD data storage 355. To that end, a neighbor broadcast can be used if the network component 33 provides such a mechanism efficiently. Other possible means include unicasting the distances to all neighbors.

The RDR device 353 is operable to receive Distance Reports 332 from the neighbored nodes. This can be accomplished e.g. by using the reception means of a neighbor broadcast or of a unicast using the network component 33. For every entry in the report 332, the corresponding distance is entered into AD data storage 355 if the "time since measurement" value is smaller or equal than the corresponding value in AD data storage 355. When a node occurs in a distance report 332 that is not contained in AD data storage 355, it is entered there.

If in a certain time interval no reports from a neighbor node have been received its host status is queried. If the node is found to be sleeping, the neighbor closure (minus the already known nodes in AD data storage 355) of this node is queried periodically. This closure is stored and inserted into AD data storage 355 (without distance values). When this node awakes, this closure is removed (also from AD data storage 355).

The DC device 354 is operable to periodically check the "time since measurement" values of all entries in the list of the AD data storage 355 and increments the "time since measurement" value. If this value exceeds a certain threshold or if no value is entered at all, it queries the corresponding distance remotely using the network component 33 and sets the "time since measurement" value accordingly. If a node is not accessible for some time, it is removed from AD data storage 355.

The AD data storage 355 is operable to contain a list or a matrix with all known distances between all known nodes. Every entry contains also a time period value that contains the time since measurement.

The P device 34 is operable to be used at nodes where applications want to know positions of nodes in the network to compute these positions using the table of all distances gathered by the DMG device 35. When the first application issues a command to get positions, the positioning is started. After the last application issued a command to stop getting positions, the positioning can be stopped. This method is described more explicitly later in FIG. 5.

The P device 34 comprises the Basis finder (BF) device 342, the Position calculator (APC) device 343, the Position monitor (QPM) device 344, the Movement monitor (MM) device 345, the Moved position calculator (MPC) device 346, the Query/Subscribe (QS) device 341 and the Positions (AP) data storage 347. In FIG. 3 the position calculator 343, the position monitor 344 and the position data storage 347 are indicated as AllPositionCalculator, QoPosMonitor and AllPositions, respectively. The BF device 342 is operable to calculate all possible bases (consisting of 4 nodes) via the Basis Selection method described in FIG. 9 and/or to calculate the positions of the base node which are put into the AP via the Base node position calculation method described in FIG. 10. During the Basis Selection method several bases are chosen by using the AD data storage 355. Four nodes are a basis when each of these nodes fulfills the following requirements: a node is a direct neighbor to the other 3 nodes, the respective distances are not 0 and the nodes are orthogonally independent (e.g. using the triple scalar product). Afterwards the Base Node Positions Calculation is executed and all positions of the base nodes are put into AP data storage 347. Moreover, the BF device 342 is operable to calculate the relative coordinate system.

The APC device 343 is operable to calculate the initial positions of all nodes in the network. The process is described in FIG. 6.

The QPM device 344 is operable to monitor the "quality" of the positioning achieved using the current basis and to restart the Basis Finding process via the BP device 342 in case of either the number of positioned nodes drops below a certain threshold and/or the quality of the positioning as measured e.g. by the GER of the entire network drops below a certain threshold. To that end this device monitors AP 355 and AD 347 data storages.

The MM device 345 is operable to monitor the distances in order to detect movements of single nodes. The detection is described in FIG. 7.

The MPC device 346 is operable to calculate the new position of possibly moved nodes and stores them into AP data storage 347. In addition, the position of newly appeared nodes is calculated and stored in AP data storage 347. Also, disappeared nodes are removed from AP data storage 347. The calculation is described in FIG. 8.

The QS device 341 is operable to allow applications to get the positions of nodes identified by their MAC address. This can take place either as a GET function or as a subscribe/event mechanism. The positions are taken from the local AP data storage 347.

The AP data storage 347 is operable to contain the calculated positions for all known nodes (if the positions could have been calculated).

The following technologies can be used for implementing different parts of the invention:

The Time-of-arrival (TOA) technology allows to calculate a distance between two wirelessly connected devices by using the length of the time interval until the arrival of the signal from the one to the other device to calculate the distance between the devices. This requires time synchronisation of the two devices.

The Time-difference-of-arrival (TDOA) technology allows to calculate a distance between two wireless connected devices by using the time difference in the time of arrival of the signal from the one to the other device to calculate the distance between the devices. This requires time synchronisation of the two devices.

According to RSSI (Received Signal Strength Indication) and to the law of (e.g. RF) wave propagation, the received signal strength value can be calculated into a distance between receiver and the sender of the signal if the propagation conditions on the signal way are known.

As stated in http://www.multispectral.com/UWBFAQ.html#UWBFAQ1, for Ultra-wideband (UWB) "The basic concept is to develop, transmit and receive an extremely short duration burst of radio frequency (RF) energy—typically a few tens of picoseconds (trillionths of a second) to a few nanoseconds (billionths of a second) in duration. These bursts represent from one to only a few cycles of an RF carrier wave. The resultant waveforms are extremely broadband [ . . . ]." Distance measurement (delivering the input data for positioning) can be achieved advantageously with UWB (using e.g. TOA) because multi-path is less a problem in this technology.

The advantages of using ultrasonic technology are relatively low frequencies, which are easy to handle with electronics, and the simple and cheap structure of the device. The main disadvantage is the large divergence of the beam (the width of the beam being some tens of degrees), slowness, multiple reflections and large attenuation in long distances.

The Linear Independence Check technology controls whether a basis is linearly independent, the scalar triple product of the base vectors (i.e. the vectors from the origin to the other three points) can be calculated. If this product is 0, the base is not linearly independent.

As a matter of course the subject-matter of the present invention is not limited to the above-mentioned technologies as a skilled person knows.

Figure 4:
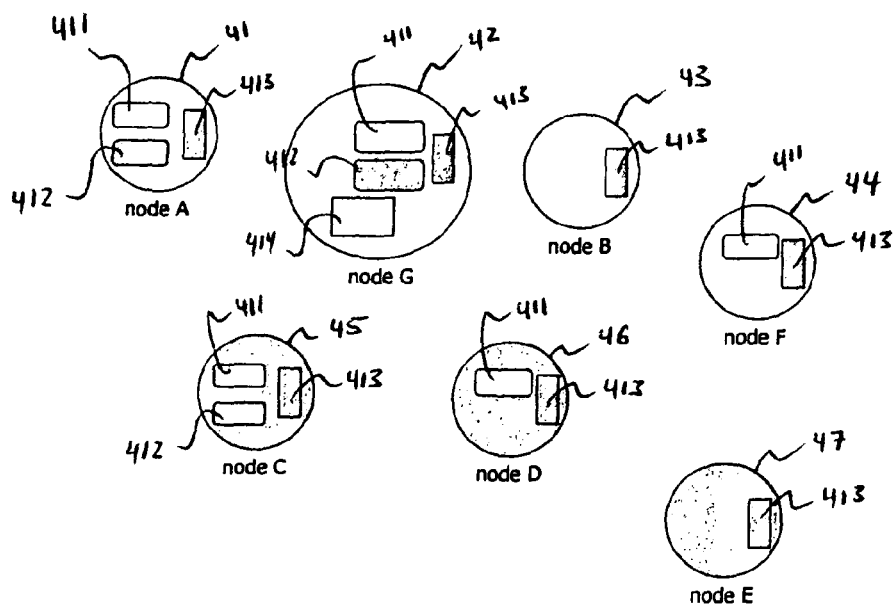
FIG. 4 shows an example of a network configuration of possible nodes, wherein several nodes comprise an alternative embodiment of the present invention.

FIG. 4 shows an example of a schematical view of a wireless network system comprising a plurality of similar or same type of network nodes like the ones described in FIG. 3. The wireless network system is operable to establish connections among each network nodes 41 to 47, respectively. The network nodes 41, 42, 43 and 44 are (momentarily) awake nodes where all DMG devices 411, 412, 413 and 414 are active. In contrary the network nodes 45, 46 and 47 are (momentarily) sleeping nodes where only the network component 413 is active while all other devices of the network nodes 45, 46 and 47 are inactive. All devices described in FIG. 4 are the same or similar as described in FIG. 3.

Node 41 and 45 are comprising a DMG device 411, a P device 412 and a network component 413. Node 42 is comprising a DMG device 411, a P device 412, a network component 413 and a position using application 414. Node 43 and 47 are comprising a network component 413, while node 44 and 46 are additionally comprising a DMG device 411, respectively. Eventually every network node 41, 42, 43, 44, 45, 46 and 47 is comprising a network component 413. In order for the P device to be active or said operational, at least one position using application 414 is located on the node where the P device 412 is running. Depending on the distance the network nodes 41 to 47 are operable to form a wireless connection to the other network nodes, respectively.

Since only node 42 comprises a position using application 414 that is querying for the positions of the other network nodes, node 42 will be the device operable to show the positions of the other network nodes. Nevertheless, other network nodes like 41 and 45 comprising the embodiment of the present invention, said embodiment comprising the DMG 411 and the P 412 device, are operable to record the positioning of the network nodes. Although the network nodes 43 and 47 only comprise a network component 413, respectively, the network nodes comprising an embodiment of the subject-matter are operable to establish a connection and/or detect the distance of the network nodes 43 and 47 or similar nodes.

Figure 5:
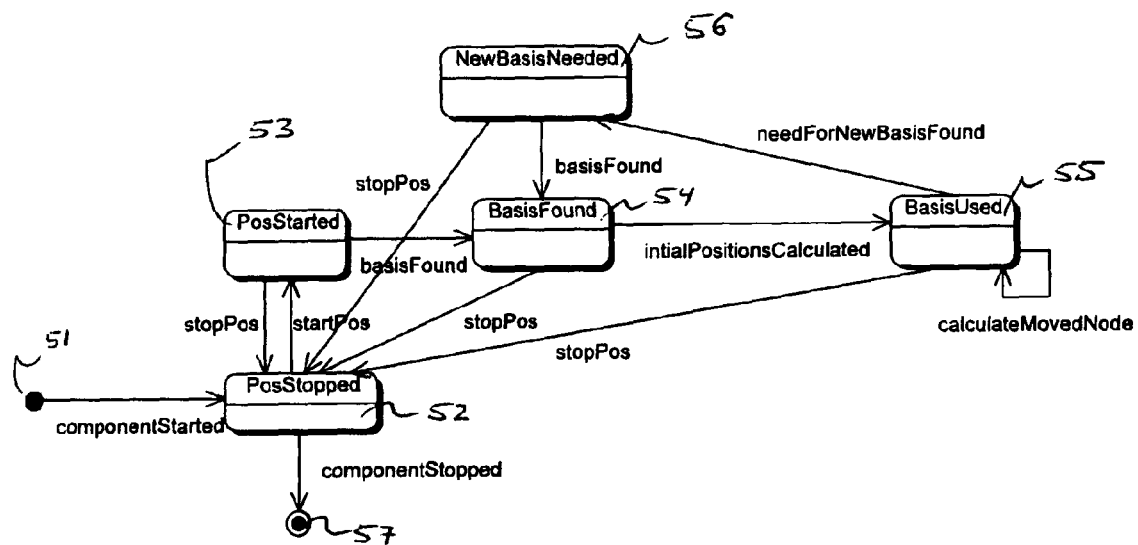
FIG. 5 shows a flow chart of an example of a method which is accomplished by a positioning device being part of an embodiment of the present invention.

FIG. 5 shows an example of a state chart of a positioning process of a Positioning (P) device, wherein said P device is the same as described in FIG. 3. The state chart is a process of the P device to be operable to compute positions of nodes in a network using the data in the AD data storage, whereby this data comprising all distances was gathered by the DMG device described in FIG. 3. Eventually all devices described in FIG. 5 are the same as described in FIG. 3. The state chart comprises the start point 51, the end point 57, the PosStopped state 52, the PosStarted state 53, the BasisFound state 54, the BasisUsed state 55 and the NewBasisNeeded state 56.

After the positioning process has been started, first a basis for the coordinate system is selected. This basis is then used to initially calculate all positions and to, later on, update the positions of moved nodes. When the need for a new basis is stated, the cycle of finding a new basis and calculating the positions is entered again.

Described in more detail: After the P device is activated, the process starts from the start point 51 and enters the PosStopped state 52. From PosStopped state 52, either the process of the P device can be stopped yielding to the end point 57 or the process is started yielding to the PosStarted state 53. From the PosStarted state 53, either the process is stopped yielding back to the PosStopped state 52 or a basis is found yielding to the BasisFound state 54. From the BasisFound state 54 either the process is stopped yielding back to the PosStopped state 52 or the initial positions of the basis is calculated continuing to the BasisUsed state 55. From the BasisUsed state 55, the process is either stopped yielding back to the PosStopped state 52 or due to the need of a new basis continued to the NewBasisNeeded state 56. Another option calculates the position of the moved nodes by looping back from the BasisUsed state 55 to itself. From the NewBasisNeeded state 56, either the process is stopped yielding back to the PosStopped state 52 or a new basis is found yielding to the BasisFound state 54.

The PosStopped state 52 is the initial and final state of the process. The PosStarted state 53 denotes that the processing has been started. At this state initial processing data/parameters necessary for continuing the process are already provided and/or processed. The parameters comprise commands and/or data sent to and/or received from the sub-devices, which are part of the P device and are described in FIG. 3. If the process finds a basis and is not disrupted at this point, the process is selecting a basis. The BasisFound state 54 denotes that an appropriate basis is found. The BasisUsed state 55 denotes that the found basis is used for the additional positioning calculations. The NewBasisNeeded state 56 denotes that a new basis instead of the used basis is needed for the continued positioning calculations.

All in all the process and its decisions can be controlled automatically and/or manually by a user.

When coordinates in a specified coordinate system are needed while only coordinates in another (rather random) coordinate system can be calculated by the positioning system, a well-known, later-on explained technique of converting the coordinate system of the relative system into the target coordinate system can be used. 3 known positions in the 2D case and 4 in the 3D case can specify the target coordinate system. For each of these positions, the values in both coordinates systems have to be known. Using these values a coordinate system transformation function can be calculated that can be used to transform any other position from the one coordinate system into the other coordinate system. This transformation function contains an origin translation vector and a set of the base vectors of the old coordinate system expressed in the new coordinate system.

As the invention provides means to determine whether nodes have moved (calculated by the Movement monitor device using the distance information), and whether the coordinate system changed, this information can be used to compute the transformation value also for the next relative coordinate system (given the Position monitor device decided to re-start the basis finding process) given not less than 3 (4 in the 3D case) nodes did not move without the need that these non-moving nodes are the ones whose position were known when calculating the first transformation function. This can be reached by recalculating the transformation function when the coordinate system changed using the transformed positions of the nodes that did not move between the last position calculation in the old relative coordinate system and the first position calculation in the new relative coordinate system. As a result, the position of all nodes for which a position can be calculated by our invention can also be transformed to a given (e.g. non-relative) coordinate system given the initial position of 3 (4 in the 3D case) nodes in this given coordinate system are known at the beginning.

Figure 9:
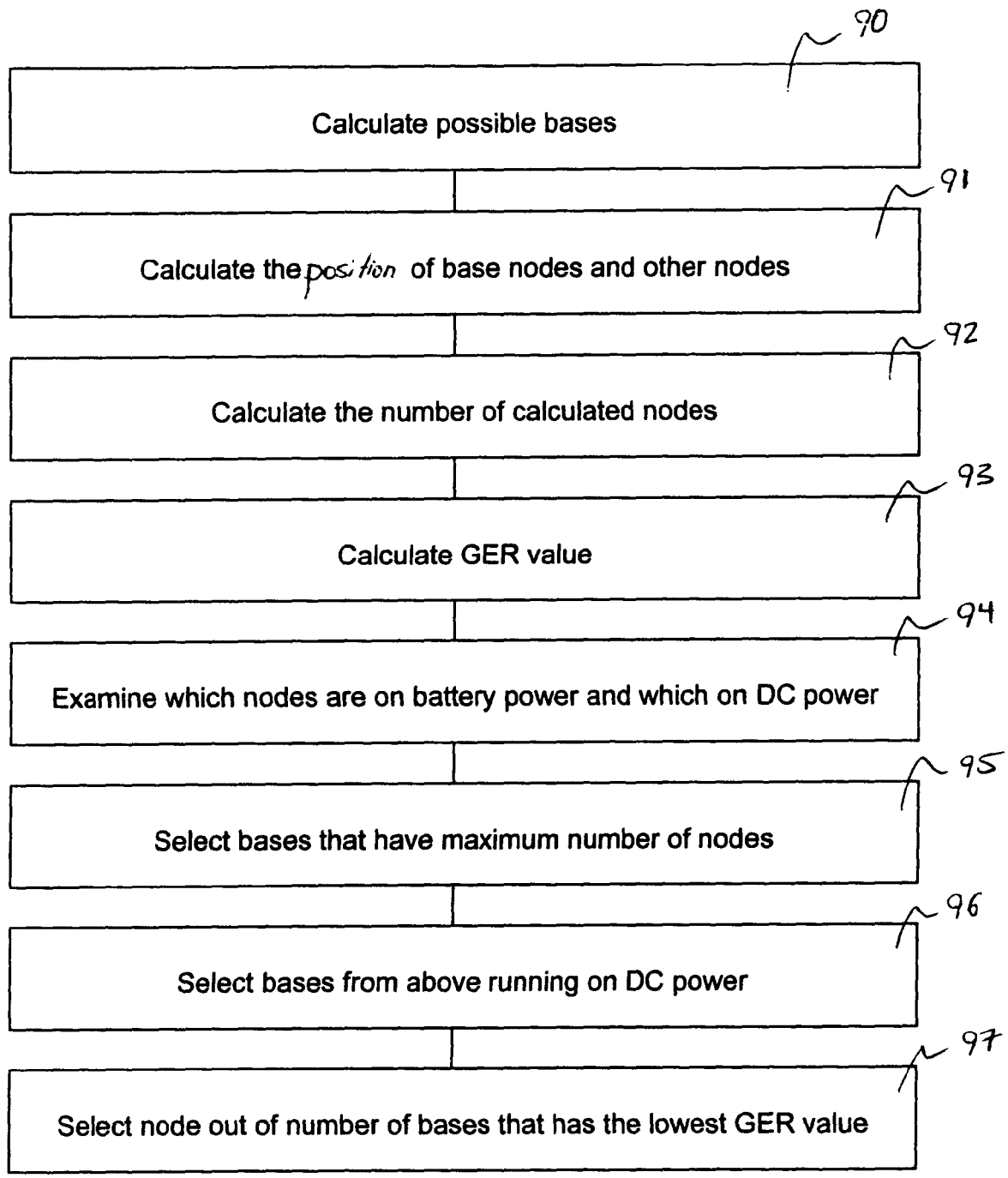
FIG. 9 shows a flow chart of an example of a method which is accomplished by a Basis finder device being part of an embodiment of the present invention.

When it comes to the Base Selection described in FIG. 9, considering converted coordinate systems provides an additional selection criterion. The above described transformation function contains a set of base vectors of the old coordinate system expressed in the new coordinate system. The new criterion is the Scalar Triple Product of these base vectors normalized to the length 1. The absolute value of this value has to be close to 1 in order to have a good transformation function. Bases whose Scalar Triple Product of this base vectors differ from this value significantly can therefore be down-prioritized.

Converting a coordinate system adds an additional position error that can be significantly larger than other errors in the Positioning System. Therefore, it is possible to check the quality of the achieved positions after the transformation and to set the position of some nodes in the list of transformed positions to "NO POSITION" if certain quality criteria are met. Analogue to the used mechanism, the quality criteria are the same as in FIG. 6.

Figure 6:
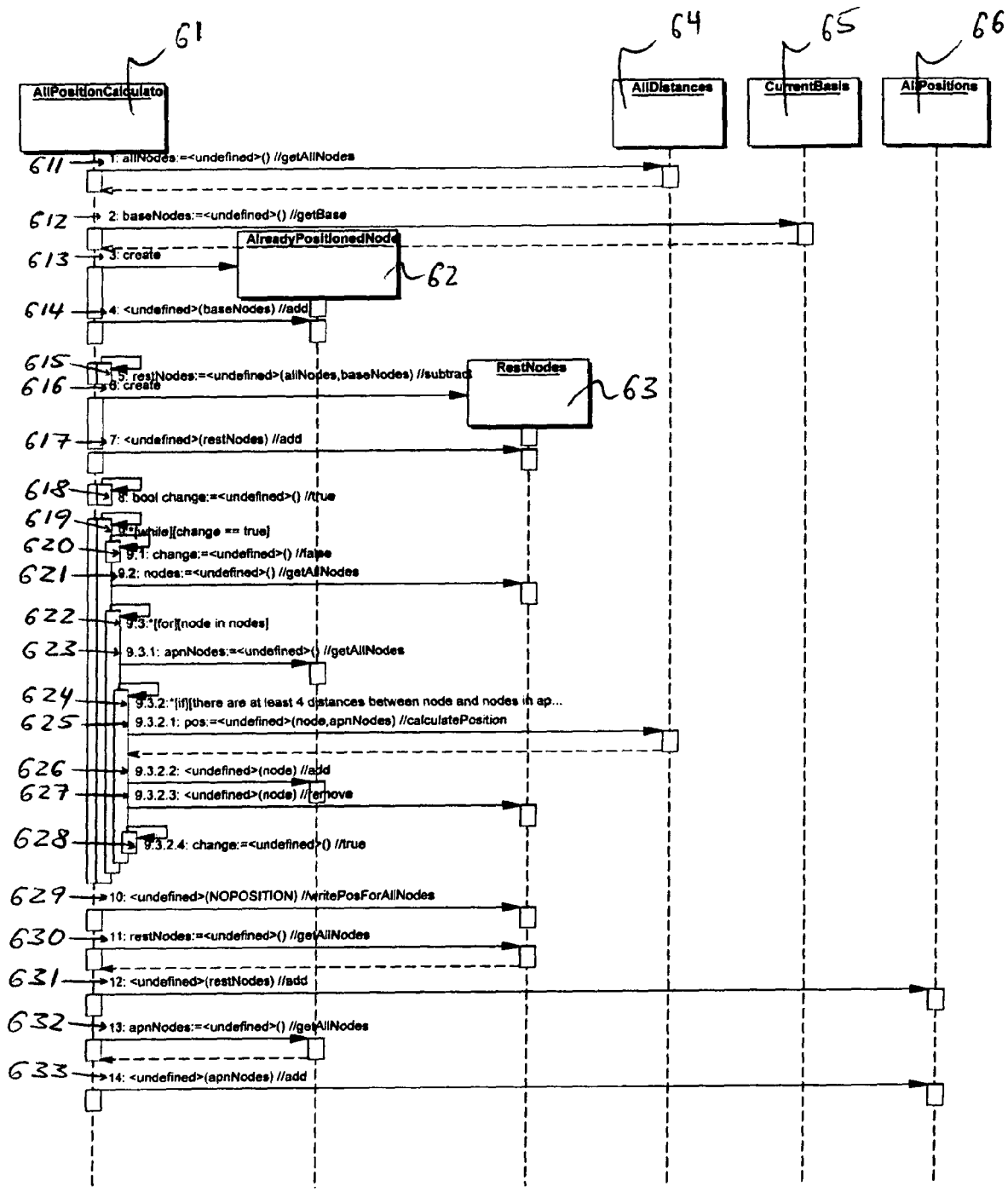
FIG. 6 shows a flow chart of an example of a method which is accomplished by a Position calculator device being part of an embodiment of the present invention.

FIG. 6 shows an example of a flow chart of a initial positioning process of an Position calculator (APC) device 61, wherein said APC device 61 is the same as described in FIG. 3. The flow chart is an iterative process of the APC device 61 to be operable to calculate the initial positions of all nodes in a network. The process comprises an APC device 61, an AlreadyPositionedNodes (APN) device 62, a RestNodes (RN) device 63, an Distances (AD) device 64, a CurrentBasis (CB) device 65, an Positions (AP) device 66 and the processing steps 611 to 633.

Initially all base nodes are added to the AlreadyPositionedNodes device 62. The other nodes are added into the RestNodes device 63. Then a loop is entered that is done as long as the position of at least one node has been calculated in the last iteration. For every node in RestNodes device 63 it is tried to calculate its positions using the known position of the nodes in AlreadyPositionedNodes device 62 and the distances of this node to the nodes in the AlreadyPositionedNodes device 62. This can be done if there are at least 4 nodes in AlreadyPositionedNodes device 62 to which a valid distance to the node exists. The calculation is then done using the Basic 3D Positioning Algorithm described in FIGS. 8, 10 and 11. If the node can be positioned, it is moved from RestNodes device 63 to AlreadyPositionedNodes device 62 and the calculated position is stored. After the loop the remaining nodes in RestNodes device 63 are set to "NO POSITION". The resulting positions are stored in Positions device 66.

As a final stage, this component checks the quality of the achieved positions and sets the position of some nodes in Positions device 66 to "NO POSITION" if certain quality criteria are met. The following criteria are met: First the calculated position is outside a plausible value. If e.g. the maximum range equals 10 m inside which communication and distance measurement is possible, and if the position of one node is (2 m, 2 m, 2 m), a position (20 m, 5 m, 3 m) of another neighbored node is impossible. Secondly, the sum of the difference in distances of a single node to all neighbored nodes using the calculated positions and using the measured distances exceeds a certain threshold value. Thirdly, the Global Energy Ratio (GER, see "Anchor-free distributed ad-hoc wireless sensor networks" by N. Priyantha et al.) of the entire network exceeds a certain threshold.

Described in more detail: In step 611 the APC device 61 loads the distances of all nodes from the AD device 64 to the variable "allNodes". In step 612 the APC device 61 loads the base nodes from the CB device 65 to the variable "baseNodes". In step 613 the APC device 61 creates an APN device 62 and furthermore adds all base nodes to the APN device 62 in step 614. In step 615 all other nodes which are not base nodes are defined as rest nodes by the APC device 61. In step 616 the APC device 61 creates a RN device 63 and furthermore adds all rest nodes to the RN device 63 in step 617. In step 618 the value of the bool variable "change" is set as true by the APC device 61. In step 619 the APC device 61 starts a while-loop which is continuing as long as the variable "change" equals the value true for the steps 620 to 628. In step 620 the value of the bool variable "change" is set as false by the APC device 61. In step 621 the APC device 61 loads all nodes from the RN device 63 to the variable "nodes". In step 622 the APC device 61 starts a for-loop looping for the number of nodes defined by the variable "nodes" and for the steps 623 to 628. In step 623 the APC device 61 loads all nodes from the APN device 62 to the variable "apnNodes". In step 624 the APC device 61 a if-condition checks whether the selected node of the for-loop has at least 4 distances with other nodes originating from the variable "apnNodes". If this is true, the steps 625 to 628 are executed. In step 625 the APC device 61 calculates the position of the prior chosen node by loading the distances from the AD device 64. In step 626 the node is added to the APN device 62 and removed from the RN device 63 in step 627. In step 628 the APC device 61 sets the value of the variable "change" to true. In step 629 the remaining nodes from the while-loop in the RN device 63 are set as "NO POSITION". In step 630 all nodes from the RN device 63 are loaded into the variable "restNodes" and are added to the AP device 66 in step 631. In step 632 all nodes from the APN device 62 are loaded into the variable "apnNodes" and are added to the AP device 66 in step 633.

Thus all known and calculated positions of the nodes are available, while the unknown positions of the other nodes are set as "NO POSITION". Of course, any other value instead of "NO POSITION" can be set indicating a void value.

Figure 7:
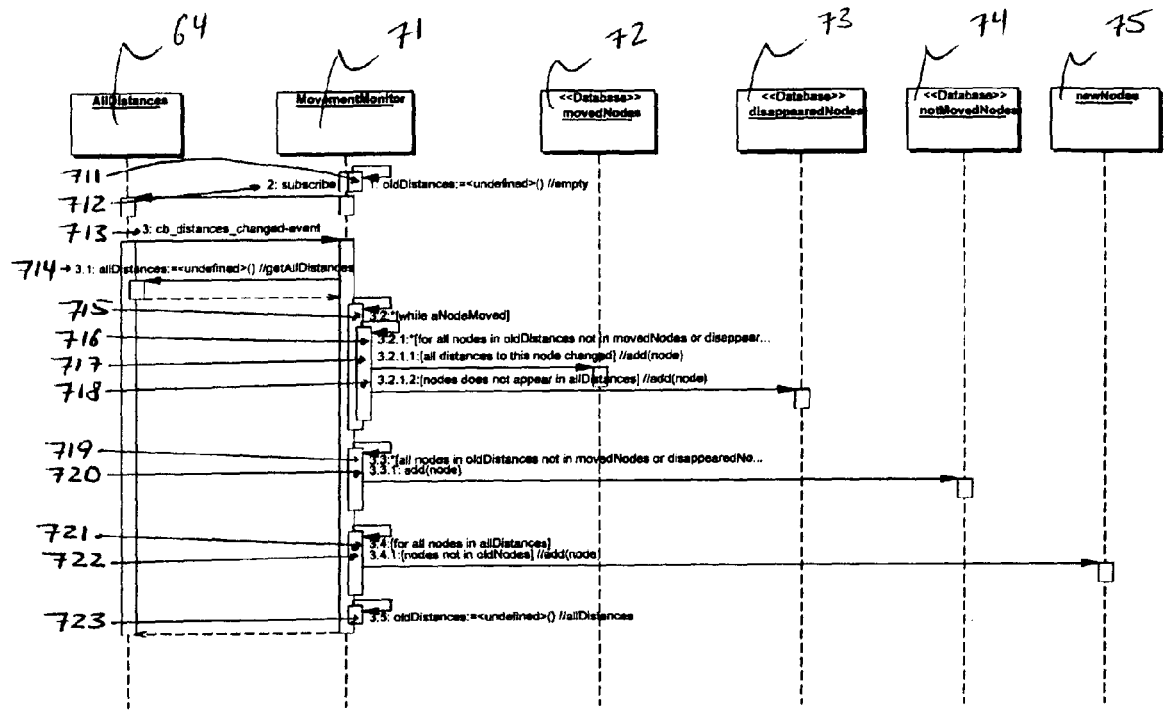
FIG. 7 shows a flow chart of an example of a method which is accomplished by a Movement monitor device being part of an embodiment of the present invention.

FIG. 7 shows an example of a flow chart of a monitoring node movement process of a Movement monitor (MM) device 71, wherein said MM device 71 is the same as described in FIG. 3. The flow chart is an iterative process of the MM device 71 to be operable to monitor the distances in order to detect movements of single nodes. The process comprises an MM device 71, a movedNodes (mN) database 72, a disappearedNodes (dN) database 73, a notMovedNodes (nN) database 74, a newNodes (nN) database 75, a Distances (AD) database 64 and the processing steps 711 to 723.

If a node movement is detected, the Moved position calculator (MPC) device, not shown in FIG. 7, is called using the parameters "set of moved nodes", "set of not moved nodes", "set of newly appeared nodes", and "set of disappeared nodes". The last two sets are used by the MPC device to handle also these nodes. The MPC device is the same as described in FIG. 3. The algorithm that states which nodes have been moved is the following:

Upon creating the MM 71, the data structure "oldDistances" is set to an empty list. Then the MM 71 subscribes at the AD data structure 64 in order to be informed when a distance value changes. Upon such an event, the MM 71 queries the all distances table and stores it under AD 64. Now a loop is entered that is left only when no new node was found to be moved to the mN 72. In this loop a loop over all nodes in "oldDistances" that are not contained in the MN 72 or the dN 73 is entered. In this second loop, two things are checked. First, if all distances to the current node to be examined have changed, this node is added to the mN list 72. Second, if the current node to be examined does not appear in AD 64, add this node to the dN 73. It can happen that a node moved while retaining its distance to some of the neighbored nodes. This is the case if the movement took place along a sphere around these nodes (as all positions on a sphere have the same distance to the center of that sphere). Therefore, if the last loop did not determine at least one moved node, the node with the most changed distances is added to the mN 72. After these nested loops, all nodes in "oldDistances" not contained neither in mN 72 nor in dN 73 are moved to the nMN 74. Then, all nodes in AD 64 not contained in "oldDistances" are moved to the nN 75. Finally, the values of AD 64 are stored in "oldDistances".

Described in more detail: In step 711 the MM device 71 empties the "oldDistances" variable and then in step 712 the MM device 71 subscribes at the AD data structure 64 in order to be informed when a distance value changes. In step 713 the command cb_distances_changed-event is sent from the AD database 64 to the MM device 71. In step 714 the MM device 71 loads all distances from the AD database 64 to the variable "distances". In step 715 a while-loop comprising the steps 716 to 718 is entered that is left only when no new node was found to be moved to the mN 72. In step 716 a for-loop for the steps 717 and 718 is starting for all nodes listed in oldDistances and not in movedNodes 72 or disappearedNodes database 73. In step 717 a node is added to the mN database 72 when all its distances are changed. In step 718 a node is added to the dN database 73, when the node does not appear in distances device 64. In step 719 a for-loop is starting for the step 720 and is loop for all nodes which are in oldDistances and not in mN 72 or dN database 73. In step 720 all these nodes are added to the nMN database 74. In step 721 a for-loop for step 722 starts for all nodes listed in AD database 64. In step 723 all distances are written into the variable "oldDistances".

Figure 8:
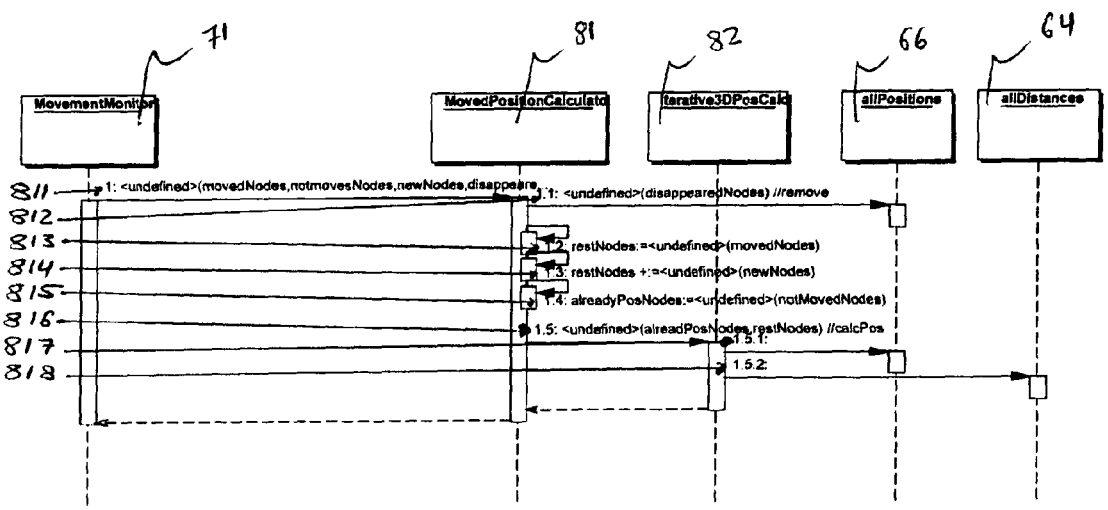
FIG. 8 shows a flow chart of an example of a method which is accomplished by a Moved position calculator device being part of an embodiment of the present invention.

FIG. 8 shows an example of a flow chart of a position calculating process of a Moved position calculator (MPC) device 81, wherein said MPC device 81 is the same as described in FIGS. 3 and 7. The flow chart is an iterative process of the MPC device 81 to be operable to calculate the new position of possibly moved nodes and stores them into Positions 66. The process comprises an MM device 71, a MPC device 81, an Iterative3DposCalc device 82, an Positions (AP) data storage 66, an Distances (AD) database 64 and the processing steps 811 to 818. All devices described in FIG. 8 are the same as described in FIG. 3.

In step 811 the MM device 71 sends the data structures "movedNodes", "notMovedNodes", "disappearedNodes", and "newNodes" to the MPC device 81. Upon reception of these data, the MPC device 81 removes in step 812 all nodes from "positions" 66 that are contained in "disappearedNodes". Then in step 813 "restNodes" is filled with the nodes from "movedNodes". In step 814 the nodes from "newNodes" are added to "restNodes". In step 815 "alreadyPositionedNodes" is filled from the nodes in "notMovedNodes". Now the positioning process described in FIG. 6 is started at step 817 (as "restNodes" and "alreadyPositionedNodes" are already determined in step 816). This process accesses "positions" 66 and "distances" 64 and writes the new positions for the nodes initially contained in "restNodes" into "positions" 66.

The basic 3D positioning algorithm is the method that returns the 3D position of a node given the known positions of a number of nodes 1 to (i−1) and the known distances of the nodes 1 to (i−1) to node i. If no position can be calculated, the algorithm returns an error.

For the basic 3D positioning algorithm, a number of possible options exist:

The Min-Max method (was already described above.)

The Min-max plus scanning multilateration algorithm starts with min-max. As a result a square (or a cube in the 3D case) is computed in which the position of the new node is contained. In a second phase now this square (cube) is divided into a number of sub-squares (-cubes). This number is determined by a pre-defined accuracy value, as the sub-squares (-cubes) have a length, width (and depth) of this accuracy value. Now for every center of the sub-squares (-cubes) the one center is selected, whose sum of squared distances between the measured and the calculated distances (using the position of the centers) is minimal. The position of the center of this square (cube) is returned as the position of the new node.

The Min-max plus binary search multilateration algorithm starts with min-max. As a result a square (or a cube in the 3D case) is computed in which the position of the new node is contained. In a second phase now this square (cube) is divided recursively into 4 (8) sub-squares (-cubes). For each center of the squares (cubes) the one center is selected, whose sum of squared distances between the measured and the calculated distances (using the position of the centers) is minimal. Then, this square (cube) again is divides into 4 (8) sub-squares (-cubes) and so on until the side length of the square (cube) reaches a certain accuracy value. The position of the center of this last square (cube) is returned as the position of the new node.

According to "Anchor-free distributed localization in sensor networks" by N. Priyantha et al., "[ . . . ] the classical mass-spring optimization method. Here, we imagine each edge in the graph as a spring between two masses, with a rest length equal to the measured distance between the two nodes. If the current estimated distance between two nodes is greater than their true (measured) length, the spring incurs a force that pushes them apart. On the other hand, if the estimated distance is larger than the true distance, a force pulls them together. Different mass-spring schemes define the magnitude of these forces differently, but the optimization proceeds essentially in the same iterative manner: at each step, nodes move in the direction of the resultant force. At any node, the optimization stops when the resultant force acting on it is zero; the global optimization stops when every node has zero force acting on it. In the optimization, if the magnitude of the force between every pair of neighbor nodes is also zero (i.e., the global energy of the system measured as the sum of squares of the forces is zero), then the optimization has reached the global minimum; otherwise, it has reached a local minimum."

FIG. 9 shows an example of a flow chart of a basis selection process of a Basis finder (BF) device, wherein said BF device is the same as described in FIG. 3. The flow chart is an iterative process of the BF device. The process comprises the processing steps 90 to 97.

In step 90 first all possible bases are calculated consisting of 4 nodes (for 3-dimensional positioning), respectively, by using the Distances database. Four nodes are a basis when each of these nodes is a direct neighbor to the other 3 nodes, the respective distances are not 0 and the nodes are orthogonally independent (e.g. using the triple scalar product). Of course, more nodes can be chosen to increase the positioning accuracy. A node is a direct neighbor of another node when they are both in communication range to establish a connection among each other. Afterward calculating possible bases every basis is evaluated. Different evaluation algorithms are possible. One advantageous evaluation algorithm for every node works as follows: In step 91 the positions of the base nodes and the positions of the other nodes are calculated with the methods describe in FIGS. 6 and 11, respectively. In step 92 the number of nodes is calculated that can been calculated (i.e. do not have a NOPOSITION value). In step 93 the Global Energy Ratio (GER, see "Anchor-free distributed ad-hoc wireless sensor networks" by N. Priyantha et al.) of the achieved positions is calculated. In step 94 it is examined which nodes run on battery power and which on DC power. After having stated these values for all possible bases, the number of bases is reduce in step 95 by selecting the bases that have a maximum or (maximum −1) number of nodes that could have been calculated (i.e. do not have a NOPOSITION value). In step 96 from the above set of bases the bases are selected that have a maximum number of base nodes that run on DC power. And, finally in step 97, select the best-suited base by selecting the node out of the reduced number of bases that has the lowest GER value.

The best suited basis is elected as the basis for the positioning.

Figure 10:
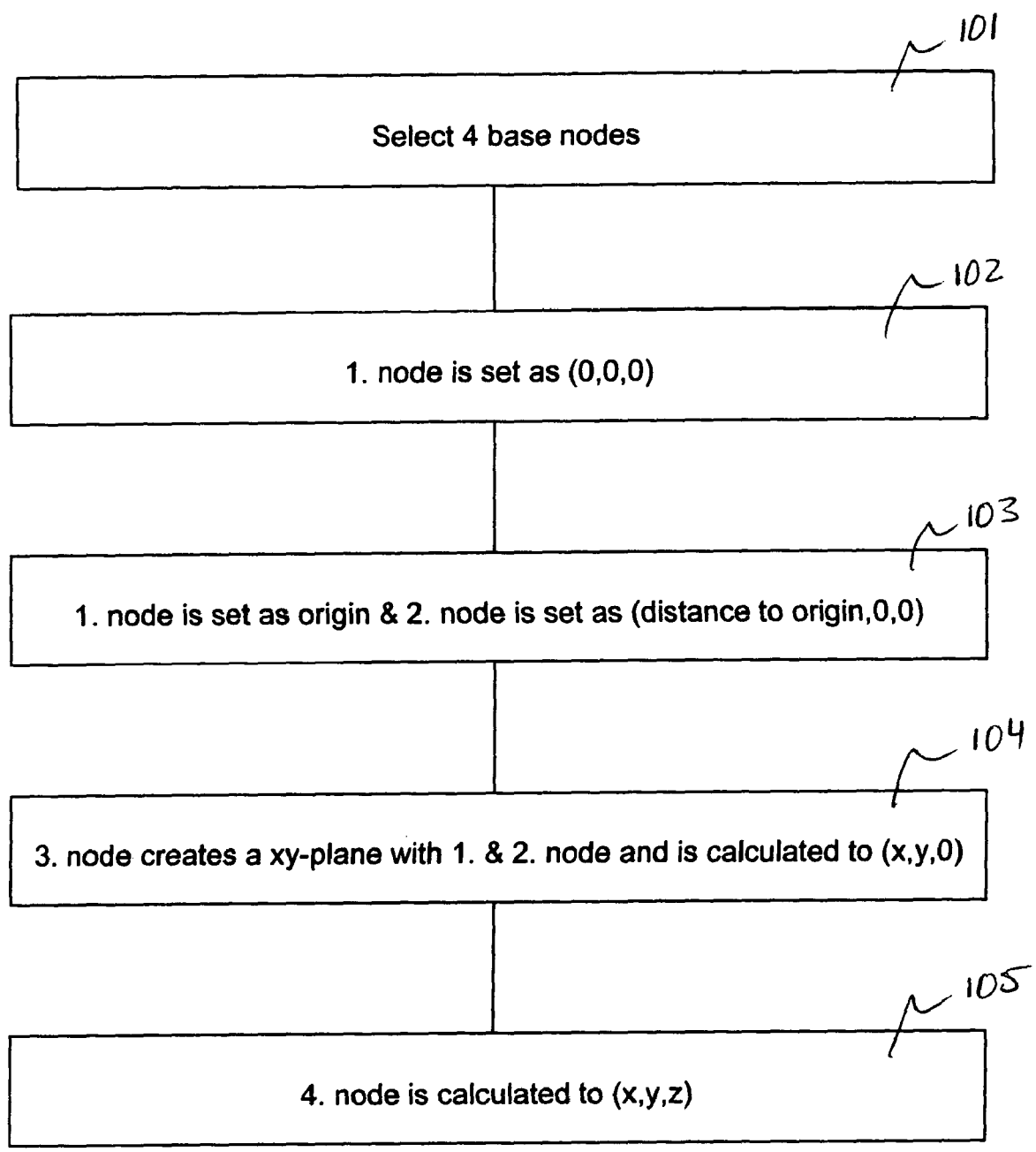
FIG. 10 shows a flow chart of an example of another method which is accomplished by a Basis finder device being part of an embodiment of the present invention.

FIG. 10 shows an example of a flow chart of a base node positions calculation process of a Basis finder (BF) device, wherein said BF device is the same as described in FIG. 3. The flow chart is an iterative process of the BF device. The process comprises the processing steps 101 to 105 and is started after the base selection process described in FIG. 9. The process is operable to calculate a relative coordinate system which is used for the calculation of all other positions.

First in step 101 four base nodes are selected from Distances database. The positions of the base nodes are calculated as follows: In step 102 one node is selected as the origin. The position of this origin is initially (0,0,0) by convention. In step 103 another node constitutes the x-axis together with the origin. The position of this node is (distance to origin, 0,0) by convention. In step 104 a third node constitutes together with the first two nodes the positive quadrant of the xy-plane. The position is calculated using a 2D trilateration (which is valid because all three nodes lie in a plane) where two circles (distances between the third node and the first and second node, respectively around the positions of the first and second node)
are intersected and (more or less randomly) one intersection position is selected. The resulting position has the format (x,y,0). The following algorithm to determine x and y is taken from http://mathforum.org/library/drmath/view/51836.html.

Let the centers of the two circles be: (a,b), (c,d)
Let the radii be: r, s $$e = c - a$$
$$f = d - b$$
$$p = \sqrt{e^2 + f^2}$$
$$k = \frac{p^2 + r^2 - s^2}{2p}$$
$$x = a + \frac{e \cdot k}{p} + \frac{f}{p}\sqrt{r^2 - k^2}$$
$$y = b + \frac{f \cdot k}{p} - \frac{e}{p}\sqrt{r^2 - k^2}$$

[difference in $x$ coordinates]

[difference in $y$ coordinates]

[distance between centers]

[distance from center 1 to line joining points of intersection]

In step 105 a fourth node constitutes together with the other three nodes the positive octant of the coordinate system. For calculating this position a modified 3D trilateration where 3 spheres are intersected (each sphere uses the position of one of the three first nodes; the radius is the distance to the fourth node). As two intersecting positions can occur, (randomly) one intersecting position is selected. The resulting position has the format (x,y,z). The algorithm 3D trilateration requires 4 known positions and the distances to these known positions. In principle this algorithm computes the intersection points of four spheres.

$$p_4 = p_1 + \frac{1}{D(p_1, p_2, p_3)} \cdot \left( -D(p_1, p_2, p_3; p_1, p_3, p_4) \cdot v_1 + D(p_1, p_2, p_3; p_1, p_2, p_4) \cdot v_2 \pm \sqrt{D(p_1, p_2, p_3, p_4)} \cdot (v_1 \times v_2) \right)$$

The advantage of this algorithm is that it is computationally less complex and that it yields perfect results when the distance accuracy is perfect. The disadvantages are that the resulting position is very sensitive to distance accuracy errors and that more known positions and their distances do not lead to a higher positioning accuracy.

Figure 11:
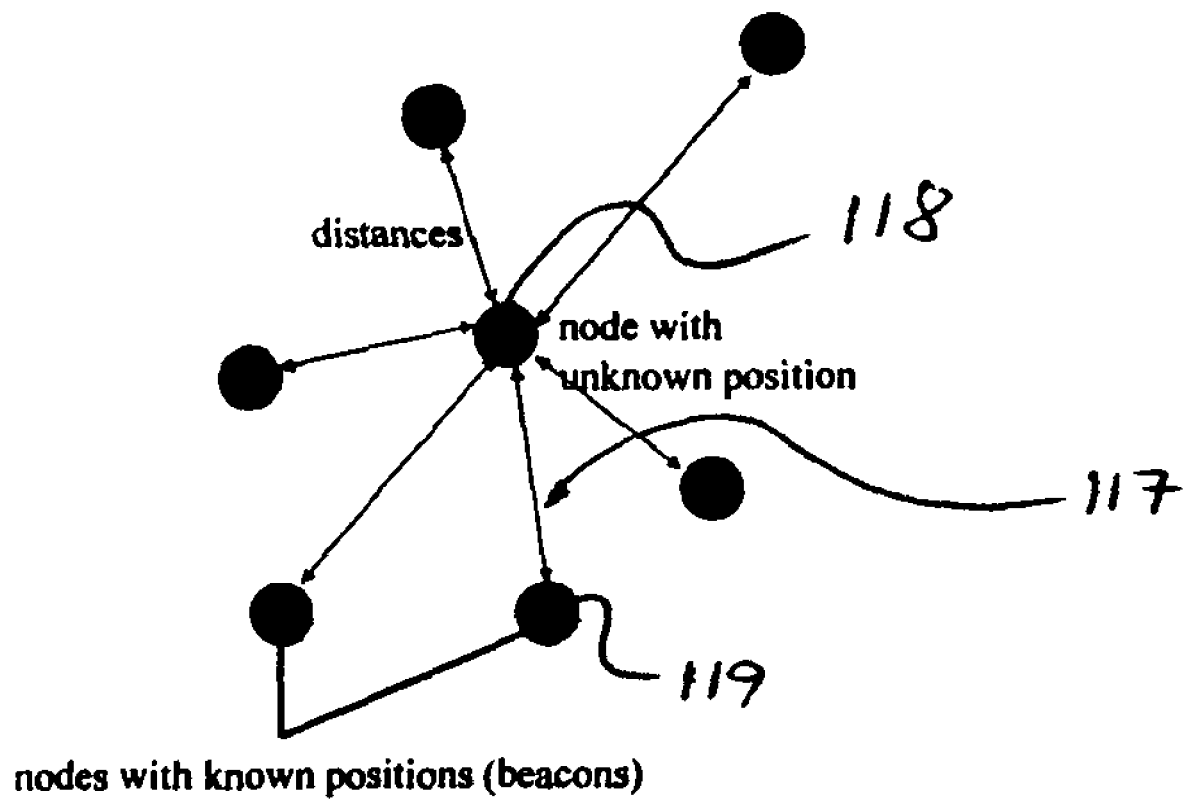
FIG. 11 shows a schematical view of an example of a method how the position determining can be calculated.

FIG. 11 shows a schematical view of an example of a network configuration comprising a plurality of nodes 119 with known positions, a node 118 with unknown position which is separated by a specific distance 117 respectively from the other nodes 119. This configuration approaches the position calculation via atomic multilateration. The atomic multilateration algorithm for the 2D case presented in "Dynamic Fine-Grained Localization in Ad-Hoc Networks of Sensors" by A. Savvides et al. is stated as follows (beacons are anchors):

"The error of the measured distance between an unknown node and its ith beacon can be expressed as the difference between the measured distance and the estimated Euclidean distance (equation 3). x0 and y0 are the estimated coordinates for the unknown node 0 for i=1; 2; 3:::N, where N is the total number of beacons, and ti0 is the time it takes for an [ ... ] signal to propagate from beacon i to node 0, and s is the estimated [ ... ] propagation speed.

$$f_i(x_0, y_0, s) = st_{i0} - \sqrt{(x_i - x_0)^2 + (y_i - y_0)^2} \quad (3)$$

Given that an adequate number of beacon nodes are available, a Maximum Likelihood estimate of the node's position can be obtained by taking the minimum mean square estimate (MMSE) of a system of fi(x0; y0; s) equations (equation 4). Term represents the weight applied to each equation. For simplicity we assume that alpha=1.

$$F(x_0, y_0, s) = \sum_{i=1}^{N} a^2 f(i)^2 \quad (4)$$

If a node has three or more beacons a set of three equations of the form of (3) can be constructed yield an overdetermined system with a unique solution for the position of the unknown node 0. If four or more beacons are available, the ultrasound propagation speed s can also be estimated. The resulting system of equations can be linearized by setting fi(x0; y0; s)=equation 3, squaring and rearranging terms to obtain equation 5.

$$-x_i^2 - y_i^2 = (x_0^2 + y_0^2) + x_0(-2x_i) + y_0(-2y_i) - s^2 t_{i0}^2 \quad (5)$$

for k such equations we can eliminate the $(x_0^2 + y_0^2)$ terms by subtracting the kth equation from the rest.

$$-x_i^2 - y_i^2 + x_k^2 - y_k^2 = 2x_0(x_k - x_i) + 2y_0(y_k - y_i) + s^2(t_{ik}^2 - t_{i0}^2) \quad (6)$$

this system of equations has the form y=bX and can be solved using the matrix solution for MMSE given by b=$(X^T X)^{-1} X^T y$ where $$X = \begin{bmatrix} 2(x_k - x_1) & 2(y_k - y_1) & (t_{k0}^2 - t_{k1}^2) \\ 2(x_k - x_2) & 2(y_k - y_2) & (t_{k0}^2 - t_{k2}^2) \\ \vdots & \vdots & \vdots \\ 2(x_k - x_{k-1}) & 2(y_k - y_{k-1}) & (t_{k0}^2 - t_{k(k-1)}^2) \end{bmatrix}$$

$$y = \begin{bmatrix} -x_1^2 - y_1^2 + x_k^2 + y_k^2 \\ -x_2^2 - y_2^2 + x_k^2 + y_k^2 \\ \vdots \\ -x_{k-1}^2 - y_{k-1}^2 + x_k^2 + y_k^2 \end{bmatrix}$$

and $b = \begin{bmatrix} x_0 \\ y_0 \\ s^2 \end{bmatrix}$

The advantage of this algorithm is that more known positions and their distances lead to a higher positioning accuracy. The rather complex computation is the disadvantage.

Figure 12:
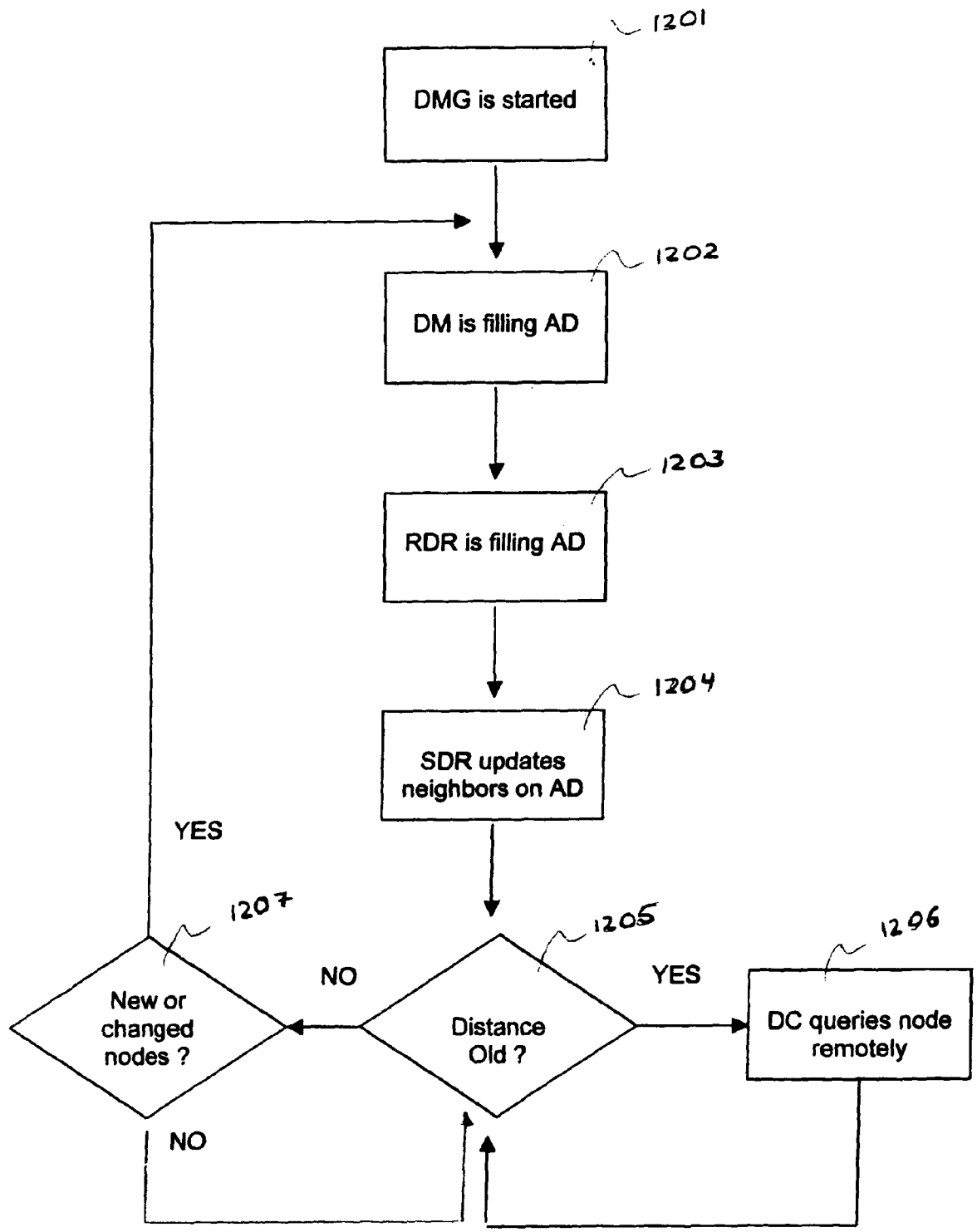
FIG. 12 shows a flow chart of an example of a method which is accomplishing the distance gathering being part of an embodiment of the present invention.

FIG. 12 shows an example of a flow chart for distance gathering that describes what happens when the DMG device is started e.g. in the case a node is powering up. All devices are the same as described in FIG. 3. The flow chart comprises the processing steps 1201 to 1207.

In step 1201 the DMG is started. In the next step 1202 the DM device, which is measuring distances locally to all neighbors, is partially filling the AD data storage. In step 1203 the RDR device, which is receiving Distance Reports from neighbored nodes is partially filling the AD data storage. At step 1204 the SDR device keeps the neighborhood updated on the current content of AD data storage. At step 1205 the entries are checked whether they are to old. This can be controlled when the value "time since measurement" exceeds a predetermined threshold. As soon as entries in AD become too old, step 1206 is executed and the DC tries to query the corresponding distance remotely. If it fails after a number of trials, it removes the entries in AD that relate to a certain node. If no distances are old, the process is yielding to step 1207. At step 1207 the process controls whether new nodes appeared in the last distance retrieval or entries were changed by the DC. If yes, the process starts at step 1202 again. If no, the process returns to step 1205. The complete process is stopped at any point of the flow chart only when the DMG device is explicitly stopped.

This process can be proceeded any other way known a skilled person and is not limited to this example. E.g. the sequence of filling the AD data storage can be changed or even be processed parallel.

Figure 13:
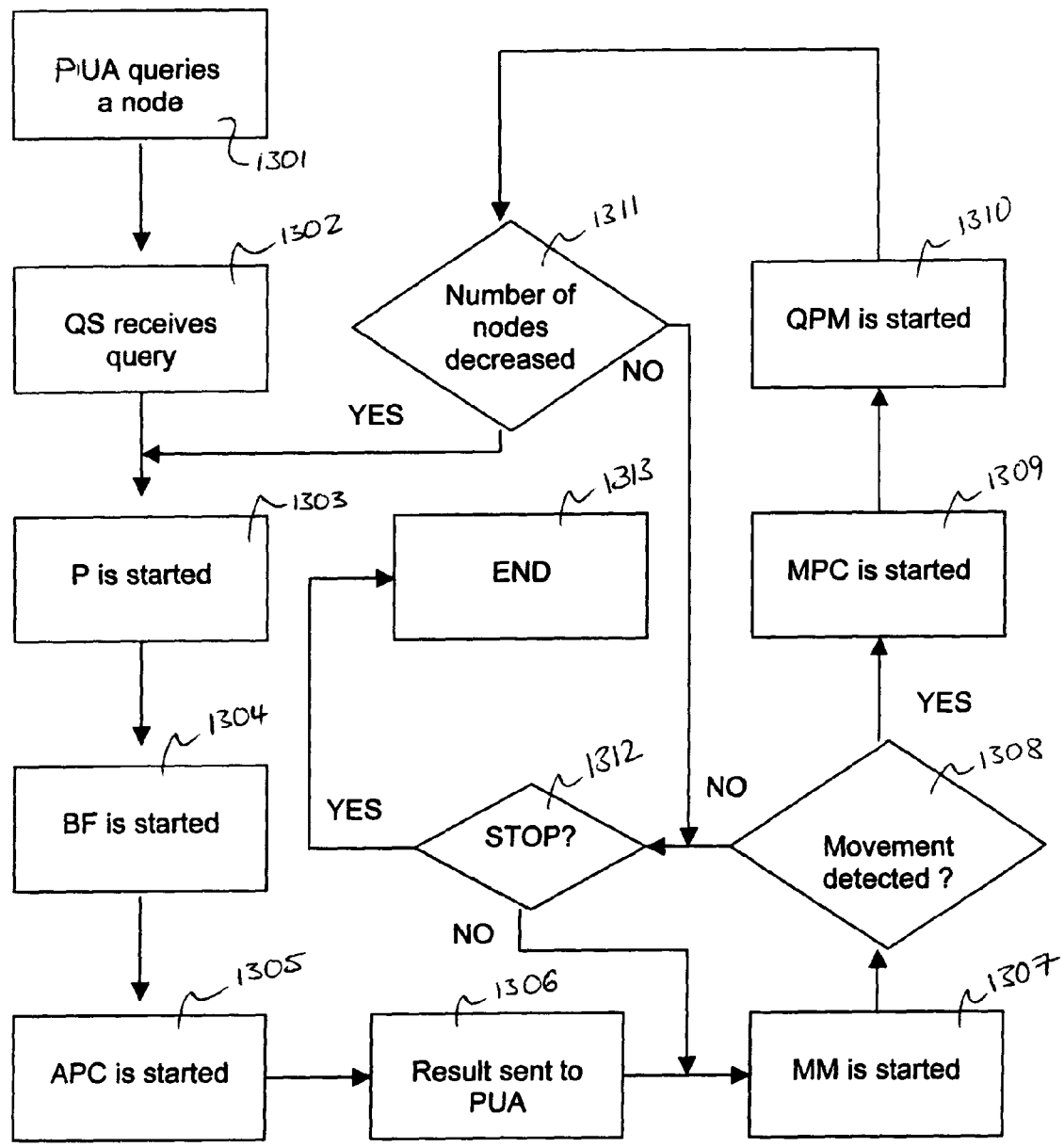
FIG. 13 shows a flow chart of an example of a method which is accomplishing the positioning calculation process being part of an embodiment of the present invention.

FIG. 13 shows an example of a flow chart for positioning calculation process which is executed when the P device is started. All devices are the same as described in FIG. 3. The flow chart comprises the processing steps 1301 to 1313.

Initially, we assume that the P device is not yet started. A position using application queries the position of a certain node at step 1301. Next the query is received by the QS device at step 1302. The QS device starts the P device at step 1303. Upon starting, the BF device is started at step 1304. The BF device determines the best-suited basis out of a number of possible basis candidates, calculates the positions of the base nodes and adds these positions into AP. After the BF has finished, the APC is started at step 1305. The APC tries to calculate as many positions of the network nodes using the already known positions of the base nodes as possible, adds these positions to AP, and adds for the nodes for which no position could have been calculated a corresponding entry in AP. Now the position query of the position using application (PUA) can be answered which is done in step 1306.

Then the MM device is started at step 1307. Upon starting, the MM device monitors all distances in order to detect distance changes which is performed at step 1308. This can be done either actively via a polling process, or, when the DMG device offers a possibility to subscribe for "distance change events", by subscribing to these events at the DMG device. If no change is detected, the process returns to step 1307 continuing with monitoring. Upon detecting a change in distances, the MM device calculates the set of nodes that moved, the set of nodes that did not move, the set of nodes that appeared and the set of nodes that disappeared. These sets are then delivered to the MPC device in step 1309. Using a similar algorithm as it is used in the APC device, the MPC device calculates the new positions of the nodes that moved and of the nodes that appeared and removes the entries in AP concerning the nodes that disappeared.

Then the QPM device is started in step 1310. This device periodically monitors the positions in AP in order to detect significant decreases in the number of positioned nodes wherein said detection is performed at step 1311. As soon as such a decrease is detected, QPM re-starts the Positioning (while retaining all subscriptions and queries in the QS component) at step 1303. Otherwise when no decrease is detected, the process yields to step 1312.

When the positioning process is running, i.e. has been started already, querying a position by an application via the QS device simply is a read to the AP data storage and can therefore be answered immediately with the result of the query.

The movement of a base node is handled in the same way as the movement of a non-base node as described above. If enough nodes in the neighborhood of the base node did not move, the new position of the base node can be calculated. Please note that this does not mean that the coordinate system is changed. The base nodes define the coordinate system only initially, i.e. during the calculation done by the APC device. When a base node is moved, the BF device is eventually designed to maintain the relative coordinate system. Afterwards, as the positions of all positioned nodes are expressed in the used coordinate system based on the basis, every position calculation done by the MPC using these positions will also result in a position in this coordinate system—even if the newly positioned node is a base node.

After some time without an application being subscribed to the QS device and without a GET-style query, the QS device can decide to stop the P device at step 1312. To that end, all active components (i.e. such that employ own threads or processes) are stopped. This might mean in the case of the MM device that at step 1313 it tells the DMG device to stop informing the MM device in case of distance changes if the DMG provides such an event. If the process is not stopped, it returns to 1307 continuing to monitor.

This process can be proceeded any other way known a skilled person and is not limited to this example.

TABLE 1

|  | N-Hop ML | AHLoS | AHP | RP | SPA | AFL | ABC | Our Invention |
|---|---|---|---|---|---|---|---|---|
| Does not require some nodes to know their absolute position beforehand (relative positioning) | no | no | no | no | yes | yes | yes | yes |
| Considers 3D distances/Returns 3D positions | no | no | no | no | no | yes | yes | yes |
| Can cope with sleeping nodes | no | no | no | no | no | no | no | yes |
| Can cope with unreliable communication | no | no | no | no | no | no | no | yes |

TABLE 1-continued

| | N-Hop ML | AHLoS | AHP | RP | SPA | AFL | ABC | Our Invention |
|---|---|---|---|---|---|---|---|---|
| Does use network broadcast | no, neighbor | no, neighbor | no, neighbor | no, neighbor | yes n-hop | no, neighbor | no, neighbor | no, neighbor |
| Selects base nodes in an advantageous way | n/a[1] | n/a[1] | n/a[1] | n/a[1] | yes | no[2] | no | yes |
| Compensates for movements of base nodes | n/a[1] | n/a[1] | n/a[1] | n/a[1] | yes[3] | no | no | yes |
| Basic positioning algorithm | Min-max | iteration over atomic multilateration | iteration over atomic multilateration | iteration over atomic multilateration | parallel computation of partial positions using atomic triangulation (trilateration) and conversion of the positions into one target coordination system | rough triangulation & mass-spring optimization | iteantion over atomic multilateration | iteration over atomic 3D trilateration |

[1] Does not use a relative positioning approach
[2] The base nodes are in fact selected in an advantageous way for the calculation process, but not for stabilizing the resulting coordinate system in case of motions.
[3] There is a so-called Location Reference Group. The origin of the network is determined by the multiplicity of this group so when one node moves, the origin moves a little bit. The number of nodes in this group is a trade-off between stability and communication cost.

The invention claimed is:

1. A positioning apparatus for a wireless ad-hoc network, operable to locate a current relative position of the positioning apparatus and of a plurality of wireless electronic devices forming the wireless ad-hoc network, comprising:
   a distance measuring gathering device operable to measure and gather data, the data including distances between the positioning apparatus and the wireless electronic devices, respectively, and distances among the wireless electronic devices, wherein the distance measuring gathering device comprises a distance measurement device operable to measure the distances between the positioning apparatus and the wireless electronic devices, and
   a positioning device operable to calculate a current relative position of the positioning apparatus and the wireless electronic devices based on the distance data and a relative coordinate system, the positioning device comprising a basis finder device operable to calculate a basis and the relative coordinate system, wherein
   the basis comprises at least three base nodes,
   the base nodes comprise the positioning apparatus and at least two wireless electronic devices,
   the relative coordinate system is calculated based on positions of the base nodes,
   at least two base nodes are in a transmission range, the respective distances between base nodes being unequal to zero and the base nodes being orthogonally independent, and
   the basis finder device is operable to maintain the relative coordinate system when a base node is moved by determining a new position of the moved base node in reference to the maintained relative coordinate system.

2. A positioning apparatus according to claim 1, wherein the basis comprises at least four wireless electronic devices.

3. A positioning apparatus according to claim 1, wherein the positioning device is operable to calculate the current relative position by a 3D positioning algorithm.

4. A positioning apparatus according to claim 1, wherein the distance measurement device is operable to compensate measurement glitches or fluctuations by using predetermined threshold values.

5. A positioning apparatus according to claim 1, further comprising a network component operable to establish a connection in the wireless network with neighbored wireless electronic devices.

6. A positioning apparatus according to claim 1, further comprising a position using application operable to query the current relative position from the positioning device.

7. A positioning apparatus according to claim 1, wherein the distance measuring gathering device comprises a distances data storage operable to store distance data.

8. A positioning apparatus according to claim 1, wherein the distance measuring gathering device comprises:
   a send distance report device operable to transmit distance data to wireless electronic devices; and
   a receive distance reports device operable to receive distance data from wireless electronic devices.

9. A positioning apparatus according to claim 1, wherein the distance measuring gathering device comprises a distance completizer device operable to query wireless electronic devices.

10. A positioning apparatus according to claim 9, wherein the distance completizer device is operable to remove a wireless electronic device from the distances data storage, when the wireless electronic device is not accessible for a predetermined time.

11. A positioning apparatus according to claim 1, wherein the positioning device comprises:
   a positions data storage operable to store position data; and
   a position calculator device operable to calculate the initial positions of all wireless electronic devices in the network.

12. A positioning apparatus according to claim 11, wherein the position calculator device is operable to set the position data to a void value when the calculated position is outside a reasonable value, or a Global Energy Ratio of the entire network exceeds a certain value.

13. A positioning apparatus according to claim 1, wherein the positioning device comprises a position monitor device operable to monitor criteria of the position data, wherein the criteria comprises the number of base nodes and the quality of the measurement, and to activate the basis finder device.

14. A positioning apparatus according to claim 1, wherein the positioning device comprises:
- a movement monitor device operable to monitor the distance data to detect movements of wireless electronic devices; and
- a moved position calculator device operable to calculate the position of moved wireless electronic devices.

15. A positioning apparatus according to claim 14, wherein the moved position calculator device is operable to remove wireless electronic devices from a positions data storage operable to store positions data, when the wireless electronic device is not reachable.

16. A positioning apparatus according to claim 1, wherein the positioning device comprises a query/subscribe device operable to allow the position using application to query the position of a wireless electronic device.

17. A positioning apparatus according to claim 1, wherein the basis finder device is operable to select a basis depending on a maximum number of base nodes running with a specific power supply, or depending on its lowest Global Energy Ratio value.

18. A method for locating a current relative position of a wireless electronic device in a wireless ad-hoc network, the wireless ad-hoc network including a plurality of wireless electronic devices, the method comprising:
- gathering distances by measuring distances to wireless electronic devices as distance data or receiving a distance report from wireless electronic devices, said distance report comprising the distance data; and
- determining a basis, calculating positions and a relative coordinate system of the wireless electronic devices forming the basis, and calculating positions of the other wireless electronic devices based on the distance data and the relative coordinate system, wherein
- the basis comprises at least three base nodes,
- the base nodes comprise at least three wireless electronic devices, the base nodes having at least two base nodes in a transmission range, the respective distances between the base nodes being unequal to zero and the base nodes being orthogonally independent,
- the relative coordinate system is calculated based on positions of the base nodes, and
- the relative coordinate system is maintained when a base node is moved by determining a new position of the moved base node in reference to the maintained relative coordinate system.

19. A method for locating a current relative position according to claim 18, wherein the gathering distances further includes compensating measurement glitches or fluctuations by using predetermined threshold values.

20. A method for locating a current relative position according to claim 18, wherein the positioning further includes calculating a current relative position by a 3D positioning algorithm.

21. A method for locating a current relative position according to claim 19, wherein the positioning further includes selecting a basis of at least four wireless electronic devices.

22. A method for locating a current relative position according to claim 18, wherein
- the positioning further includes calculating the position of the wireless electronic devices or setting the position data to a void value when
- the calculated position is outside a reasonable value, or
- a Global Energy Ratio of the entire network exceeds a certain value.

23. A method for locating a current relative position according to claim 18, wherein
- the positioning further includes monitoring criteria of the position data, the criteria comprises the number of base nodes and the quality of the measurement, and
- activating the determining the basis, and the calculating the positions and the relative coordinate system.

24. A method for locating a current relative position according to claim 18, wherein
- the positioning further includes calculating positions, counting a number of calculated positions, calculating a Global Energy Ratio, and examining a power supply of the wireless electronic device, and
- subsequently selecting a basis having a greatest number of wireless electronic devices, then having a specific power supply and a lowest Global Energy Ratio value.

* * * * *